United States Patent [19]
Lo et al.

[11] Patent Number: 5,911,044
[45] Date of Patent: Jun. 8, 1999

[54] NETWORK IMAGE SCANNING SYSTEM WHICH TRANSMITS IMAGE INFORMATION FROM A SCANNER OVER A NETWORK TO A CLIENT COMPUTER

[75] Inventors: Robin Lo, Saratoga; Kanghoon Lee, Fremont; Lawrence Tremmel, Riverbank; David Stewart, San Carlos; Iwao Max Anzai, Mountain View, all of Calif.

[73] Assignees: Ricoh Company, Ltd., Tokyo, Japan; Ricoh Corporation, San Jose, Calif.

[21] Appl. No.: 08/818,685

[22] Filed: Mar. 14, 1997

Related U.S. Application Data

[60] Provisional application No. 60/030,069, Nov. 8, 1996.

[51] Int. Cl.[6] ................................................... G06F 13/00
[52] U.S. Cl. ...................................... 395/200.33; 395/681
[58] Field of Search ............................... 395/200.3, 200.32, 395/200.33, 200.34, 200.35, 200.36, 200.47, 200.48, 200.49, 200.55, 200.56, 200.57, 200.58, 200.59, 200.8, 680, 500, 681; 707/10

[56] References Cited

U.S. PATENT DOCUMENTS

| | | | |
|---|---|---|---|
| 5,440,744 | 8/1995 | Jacobson et al. | 395/200.33 |
| 5,450,571 | 9/1995 | Rosekrans et al. | 395/500 |
| 5,590,245 | 12/1996 | Leamy et al. | 345/418 |
| 5,652,908 | 7/1997 | Douglas et al. | 395/200.5 |
| 5,689,625 | 11/1997 | Austin et al. | 395/114 |
| 5,720,013 | 2/1998 | Uda et al. | 395/114 |

*Primary Examiner*—Parshotam S. Lall
*Assistant Examiner*—Viet Vu
*Attorney, Agent, or Firm*—Oblon, Spivak, McClelland, Maier & Neustadt, P.C.

[57] ABSTRACT

A system and method for performing scanning operations using a scanner connected to a server computer and transmitting acquired images from the scanner server to a client computer. A scan-to-application process is utilized which allows control of the scanner or other image acquiring device which is connected to a scanner server using a virtual TWAIN driver which interfaces to an application program running in the client computer. Image files are also transmitted to a local file storage device of the client computer using a scan-to-file operation. A network protocol is used to implement both the scan-to-application and scan-to-file operation. Computer memories are utilized to store data structures or tables containing various information utilized during the file transfer procedures. Computer memories are also used to buffer and store the protocol packet headers and transmitted information.

36 Claims, 22 Drawing Sheets

| 200 ↘ 202 | 204 | 206 | 208 |
|---|---|---|---|
| PACKET TYPE = RWP_PACKET_TYPE | DEVICE ID = Ricoh Network Scanner | VERSION = 1 | FLAGS = NONE |
| 210 | SEQUENCE NUMBER | | |
| 212 | ACKNOWLEDGMENT NUMBER | | |
| ERROR NUMBER = 0 | COMMAND = Open Session | DATA SIZE = Size of Machine Name plus Size of Network Address | |
| 214 | 216 | 218 | |

FIG. 7A

| 220 ↘ 222 | 224 | 226 | 228 |
|---|---|---|---|
| PACKET TYPE = RWP_PACKET_TYPE | DEVICE ID = Ricoh Network Scanner | VERSION = 1 | FLAGS = NONE |
| 230 | SEQUENCE NUMBER | | |
| 232 | ACKNOWLEDGMENT NUMBER | | |
| ERROR NUMBER = 0 | COMMAND = Open Session Acknowledge | DATA SIZE = 0 | |
| 234 | 236 | 238 | |

FIG. 7B

| 240 ↘ 242 | 244 | 246 | 248 |
|---|---|---|---|
| PACKET TYPE = RWP_PACKET_TYPE | DEVICE ID = Ricoh Network Scanner | VERSION = 1 | FLAGS = NONE |
| 250 | SEQUENCE NUMBER | | |
| 252 | ACKNOWLEDGMENT NUMBER | | |
| ERROR NUMBER = 0 | COMMAND = Close Session | DATA SIZE = 0 | |
| 254 | 256 | 258 | |

FIG. 7C

| 260 | 262 | 264 | 266 | 268 |
|---|---|---|---|---|
| PACKET TYPE = RWP_PACKET_TYPE | DEVICE ID = Ricoh Network Scanner | | VERSION = 1 | FLAGS = NONE |
| 270 | SEQUENCE NUMBER | | | |
| 272 | ACKNOWLEDGMENT NUMBER | | | |
| ERROR NUMBER = 0 | COMMAND = Close Session Acknowledge | | DATA SIZE = 0 | |
| 274 | 276 | | | 278 |

FIG. 7D

| 280 | 282 | 284 | 286 | 288 |
|---|---|---|---|---|
| PACKET TYPE = RWP_PACKET_TYPE | DEVICE ID = Ricoh Network Scanner | | VERSION = 1 | FLAGS = NONE |
| 290 | SEQUENCE NUMBER | | | |
| 292 | ACKNOWLEDGMENT NUMBER | | | |
| ERROR NUMBER = 0 | COMMAND = Read Scanner Parameters | | DATA SIZE = 0 | |
| 294 | 296 | | | 298 |

FIG. 7E

| 300 | 302 | 304 | 306 | 308 |
|---|---|---|---|---|
| PACKET TYPE = RWP_PACKET_TYPE | DEVICE ID = Ricoh Network Scanner | | VERSION = 1 | FLAGS = NONE |
| 310 | SEQUENCE NUMBER | | | |
| 312 | ACKNOWLEDGMENT NUMBER | | | |
| ERROR NUMBER = 0 | COMMAND = Read Scanner Parameters Acknowledge | | DATA SIZE = Size of Scanner Parameters Table | |
| 314 | 316 | | | 318 |

FIG. 7F

| 320 ↙ 322 | 324 | 326 | 328 |
|---|---|---|---|
| PACKET TYPE = RWP_PACKET_TYPE | DEVICE ID = Ricoh Network Scanner | VERSION = 1 | FLAGS = NONE |
| 330 | SEQUENCE NUMBER | | |
| 332 | ACKNOWLEDGMENT NUMBER | | |
| ERROR NUMBER = 0 | COMMAND = Set Parameters | DATA SIZE = Size of Scanner Parameters Table | |
| 334 | 336 | 338 | |

FIG. 7G

| 340 ↙ 342 | 344 | 346 | 348 |
|---|---|---|---|
| PACKET TYPE = RWP_PACKET_TYPE | DEVICE ID = Ricoh Network Scanner | VERSION = 1 | FLAGS = NONE |
| 350 | SEQUENCE NUMBER | | |
| 352 | ACKNOWLEDGMENT NUMBER | | |
| ERROR NUMBER = 0 | COMMAND = Set Parameters Acknowledge | DATA SIZE = 0 | |
| 354 | 356 | 358 | |

FIG. 7H

| 360 ↙ 362 | 364 | 366 | 368 |
|---|---|---|---|
| PACKET TYPE = RWP_PACKET_TYPE | DEVICE ID = Ricoh Network Scanner | VERSION = 1 | FLAGS = NONE |
| 370 | SEQUENCE NUMBER | | |
| 372 | ACKNOWLEDGMENT NUMBER | | |
| ERROR NUMBER = 0 | COMMAND = Terminate Scanner Job | DATA SIZE = Size of Machine Name | |
| 374 | 376 | 378 | |

FIG. 7I

| 380 | 382 | 384 | 386 | 388 |
|---|---|---|---|---|
| PACKET TYPE = RWP_PACKET_TYPE | DEVICE ID = Ricoh Network Scanner | VERSION = 1 | FLAGS = NONE | |
| 390 | SEQUENCE NUMBER ||||
| 392 | ACKNOWLEDGMENT NUMBER ||||
| ERROR NUMBER = 0 | COMMAND = Terminate Scanner Job Acknowledge || DATA SIZE = 0 ||
| 394 | 396 || 398 ||

FIG. 7J

| 400 | 402 | 404 | 406 | 408 |
|---|---|---|---|---|
| PACKET TYPE = RWP_PACKET_TYPE | DEVICE ID = Ricoh Network Scanner | VERSION = 1 | FLAGS = NONE | |
| 410 | SEQUENCE NUMBER ||||
| 412 | ACKNOWLEDGMENT NUMBER ||||
| ERROR NUMBER = 0 | COMMAND = Read File || DATA SIZE = Size of Machine Name ||
| 414 | 416 || 418 ||

FIG. 7K

| 420 | 422 | 424 | 426 | 428 |
|---|---|---|---|---|
| PACKET TYPE = RWP_PACKET_TYPE | DEVICE ID = Ricoh Network Scanner | VERSION = 1 | FLAGS = Bit1=End of Page Bit2=End of File | |
| 430 | SEQUENCE NUMBER ||||
| 432 | ACKNOWLEDGMENT NUMBER ||||
| ERROR NUMBER = 0 | COMMAND = Read File Acknowledge || DATA SIZE = Max Packet Size - (Size of Packet Header + Size of File Data) ||
| 434 | 436 || 438 ||

FIG. 7L

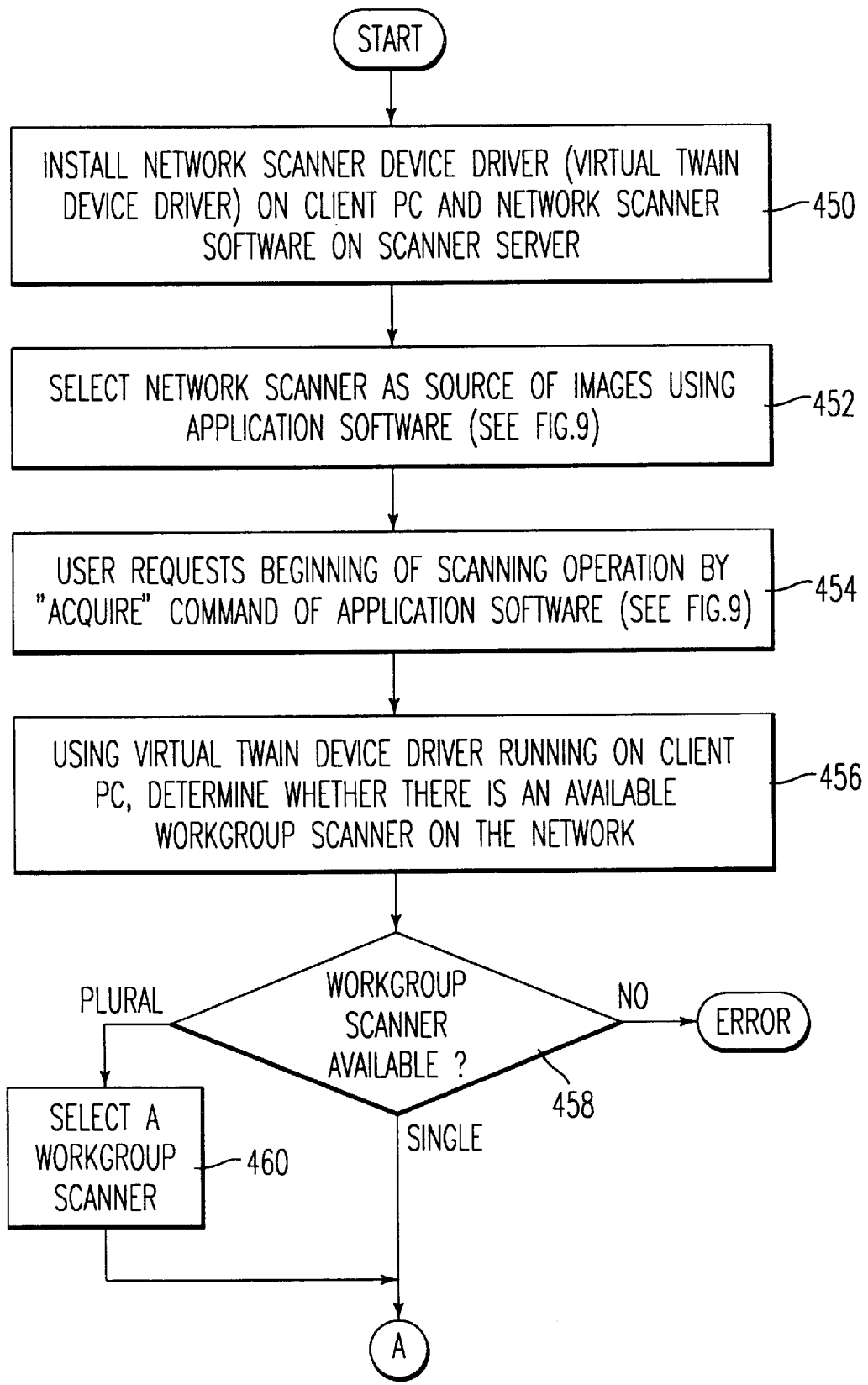

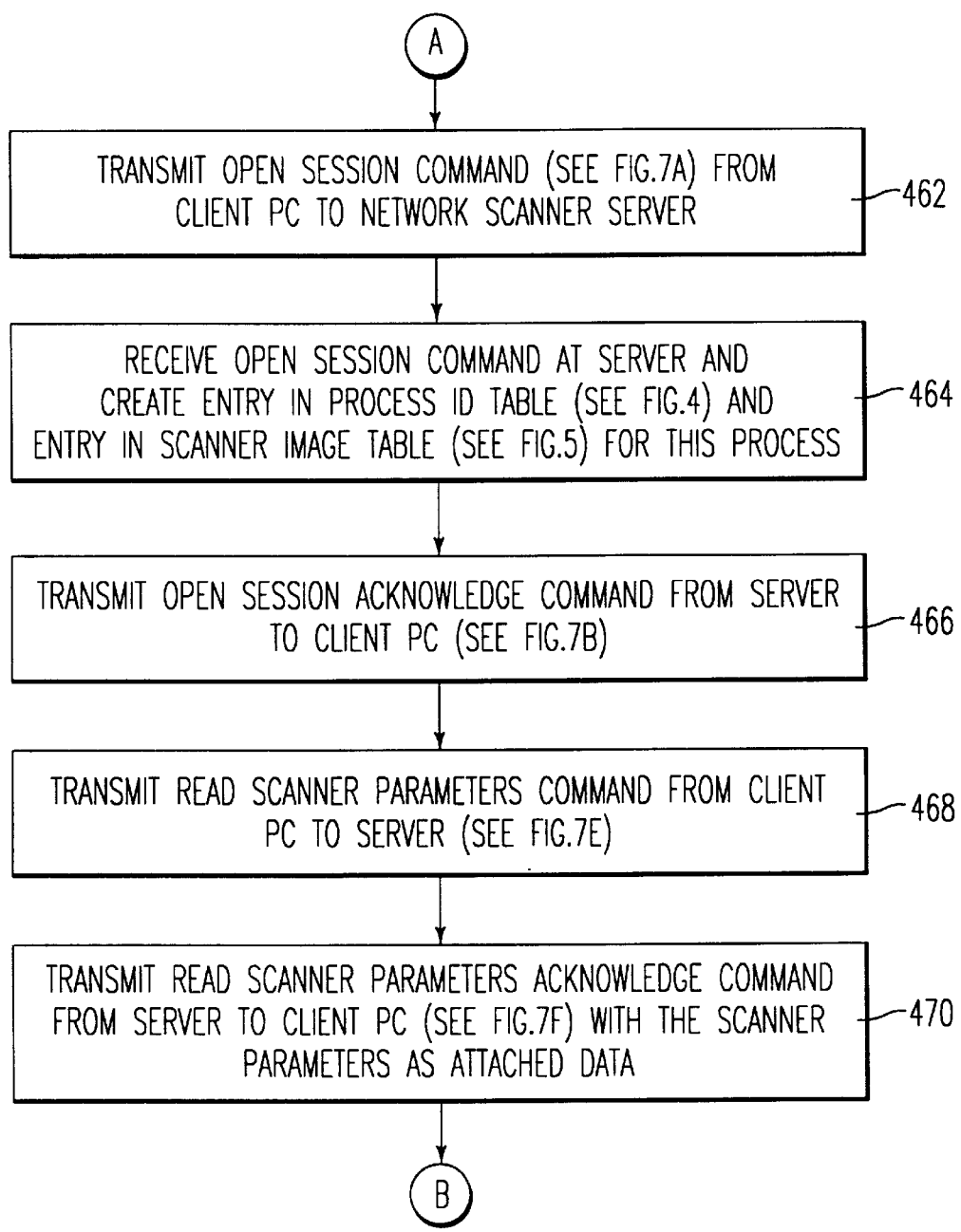

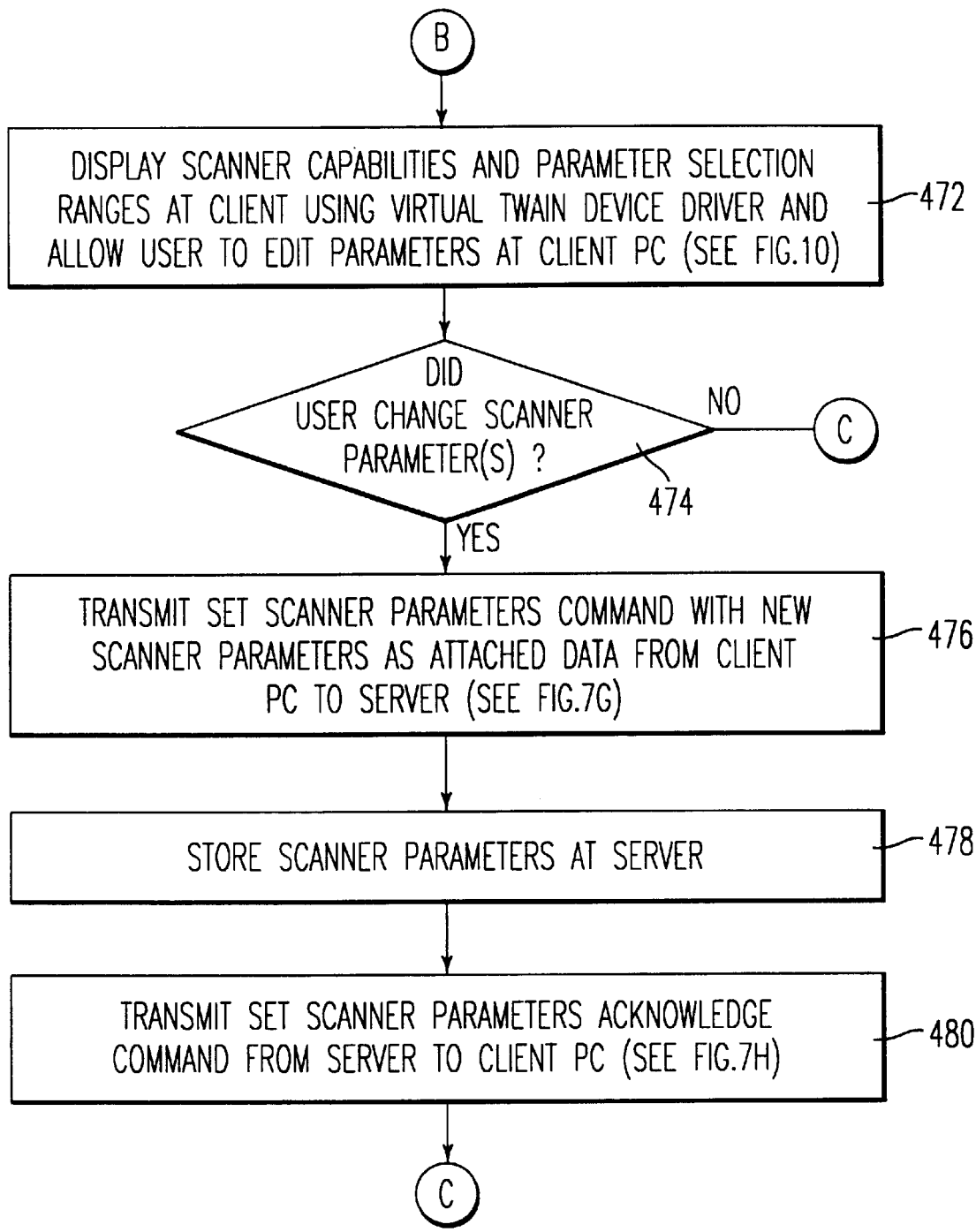

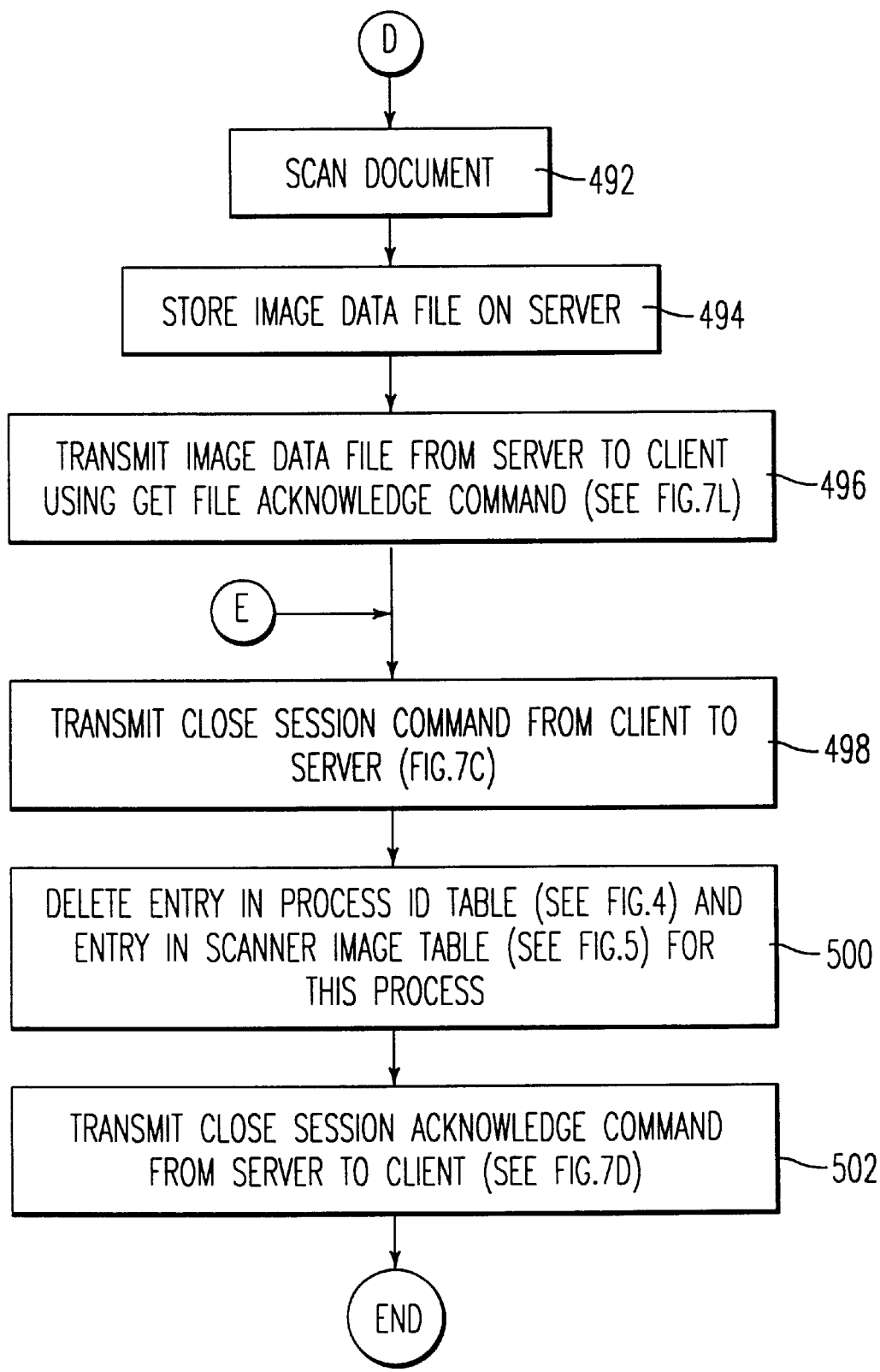

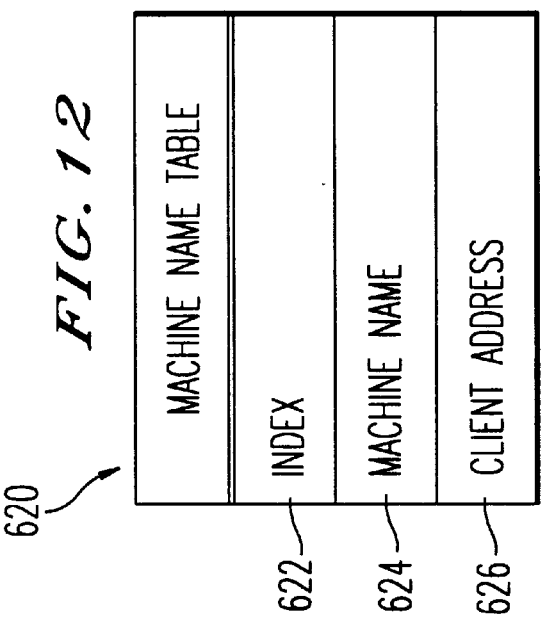
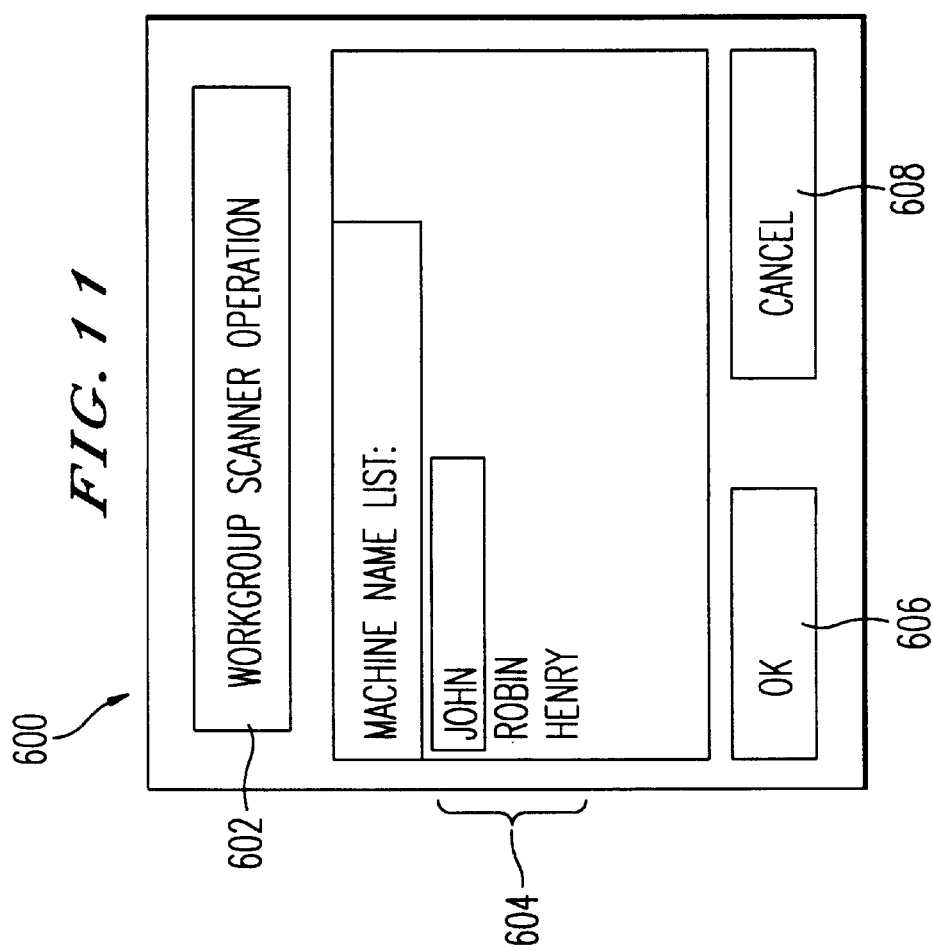

| 640 ↘ 642 | 644 | 646 | 648 |
|---|---|---|---|
| PACKET TYPE = RWP_PACKET_TYPE | DEVICE ID = Ricoh Network Scanner | VERSION = 1 | FLAGS = NONE |
| 650 | SEQUENCE NUMBER | | |
| 652 | ACKNOWLEDGMENT NUMBER | | |
| ERROR NUMBER = 0 | COMMAND = Initialize Session | DATA SIZE = Size of Machine Name plus Size of Network Address | |
| 654 | 656 | 658 | |

FIG. 13A

| 670 ↘ 672 | 674 | 676 | 678 |
|---|---|---|---|
| PACKET TYPE = RWP_PACKET_TYPE | DEVICE ID = Ricoh Network Scanner | VERSION = 1 | FLAGS = NONE |
| 680 | SEQUENCE NUMBER | | |
| 682 | ACKNOWLEDGMENT NUMBER | | |
| ERROR NUMBER = 0 | COMMAND = Initialize Session Acknowledge | DATA SIZE = 0 | |
| 684 | 686 | 688 | |

FIG. 13B

| 690 ↘ 692 | 694 | 696 | 698 |
|---|---|---|---|
| PACKET TYPE = RWP_PACKET_TYPE | DEVICE ID = Ricoh Network Scanner | VERSION = 1 | FLAGS = NONE |
| 700 | SEQUENCE NUMBER | | |
| 702 | ACKNOWLEDGMENT NUMBER | | |
| ERROR NUMBER = 0 | COMMAND = Terminate Session | DATA SIZE = Size of Machine Name | |
| 704 | 706 | 708 | |

FIG. 13C

| 710 | 712 | 714 | 716 | 718 |
|---|---|---|---|---|
| PACKET TYPE = RWP_PACKET_TYPE | DEVICE ID = Ricoh Network Scanner | VERSION = 1 | FLAGS = NONE | |
| 720 | SEQUENCE NUMBER ||||
| 722 | ACKNOWLEDGMENT NUMBER ||||
| ERROR NUMBER = 0 | COMMAND = Terminate Session Acknowledge || DATA SIZE = 0 ||
| 724 | 726 || 728 ||

*FIG. 13D*

| 900 | 902 | 904 | 906 | 908 |
|---|---|---|---|---|
| PACKET TYPE = RWP_PACKET_TYPE | DEVICE ID = Ricoh Network Scanner | VERSION = 1 | FLAGS = Bit1=End of Page Bit2=End of File | |
| 910 | SEQUENCE NUMBER ||||
| 912 | ACKNOWLEDGMENT NUMBER ||||
| ERROR NUMBER = 0 | COMMAND = Get Storage File || DATA SIZE = Max Packet Size - (Size of Packet Header + Size of File Data) ||
| 914 | 916 || 918 ||

*FIG. 13E*

| 920 | 922 | 924 | 926 | 928 |
|---|---|---|---|---|
| PACKET TYPE = RWP_PACKET_TYPE | DEVICE ID = Ricoh Network Scanner | VERSION = 1 | FLAGS = NONE | |
| 930 | SEQUENCE NUMBER ||||
| 934 | ACKNOWLEDGMENT NUMBER ||||
| ERROR NUMBER = 0 | COMMAND = Get Storage File Acknowledge || DATA SIZE = Size of Machine Name ||
| 936 | 938 || 940 ||

*FIG. 13F*

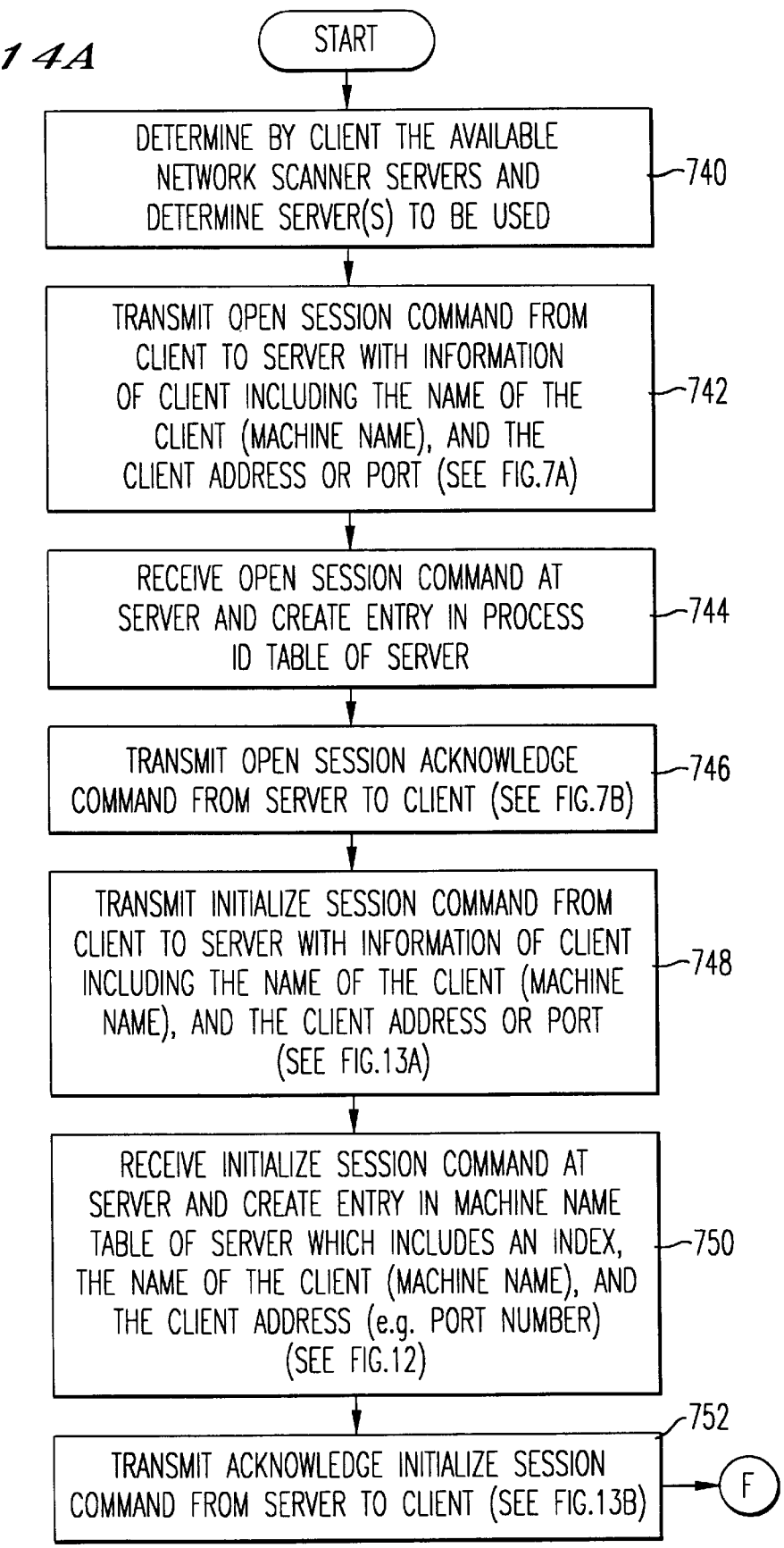

NETWORK IMAGE SCANNING SYSTEM WHICH TRANSMITS IMAGE INFORMATION FROM A SCANNER OVER A NETWORK TO A CLIENT COMPUTER

CROSS REFERENCES TO RELATED APPLICATIONS

This application claims the benefit of U.S. Provisional Application No. 60/030,069, filed Nov. 8, 1996.

BACKGROUND OF THE INVENTION

1. Field of the Invention

This invention relates to a scanning system which transfers an image from a scanner over a network to a client computer. The invention is more particularly related to a system which allows a client computer to control a scanner connected to a network and receive images from the scanner over the network in a manner which emulates a direct connection of the scanner to the client computer. The invention is still further related to transferring an image from a scanner connected to a scanner server to a client computer over a network without the intermediate step of storing an image file on a file server.

2. Discussion of the Background

With the increasing familiarity of business people with computers, more computer based tasks are being performed by more people in office environments. Image scanners are becoming a more popular device in office environments both for enabling images to be included into documents and also to obtain images of documents in order to perform optical character recognition.

Heavy users of scanning devices usually have the luxury of ready access to a scanner. However, many people who use image scanners on an infrequent basis do not have the luxury of being able to directly scan an image into an application program running on their own computer. In the situation where the user does not have his own scanner, the user must go to a scanner and generate a file containing the image. This image file can then be copied to a floppy disk and walked to the user's computer. The user's computer then reads this disk in order to process the image file. However, depending on the resolution of the scanned image, the image file may be extremely large, thus making it inconvenient for the user to copy the image file to a floppy disk and then transfer the image file on the floppy disk to the user's computer.

In an attempt to overcome this "sneaker network" concept of transferring images in which the user must physically carry the image on a storage medium from one computer to another, Hewlett-Packard has developed the HP Scanjet 4si which allows a scanner to obtain an image file and the image file is subsequently written to a network file server. The image is stored on the file server, for example in a computer mailbox. After the image file is stored on the file server, the file can be retrieved and transferred over a computer network to the local hard disk or other storage device within the user's computer, referred to as a client computer.

Disadvantages of this conventional system include the need of a separate file server and an intermediate storage of the file on the file server which is different from the final destination of the file. Further, there is no direct control of the scanner by the client computer nor can an application directly input the image file from the scanner. Therefore, conventional solutions to sharing a scanner among a plurality of users have their drawbacks and are not very convenient for the users of the shared scanner.

SUMMARY OF THE INVENTION

Accordingly, it is an object of this invention to provide a network scanning system which allows the transfer of image information from a scanner to a client computer over a computer network. It is a further object of the invention to provide a network scanning system which allows the transfer of image information from a scanner to a local computer without the need to first store the image on a network file server.

It is another object of the invention to provide a network scanning system which allows an application program running on a client computer to control and receive information from an image scanner over a computer network, in a manner which is similar to having the scanner directly connected to the client computer.

It is still another object of the invention to provide a network image scanning system which allows an image file to be transferred from a scanner server having the scanner connected thereto to the client computer, without having the image file stored on a separate file server.

These and other objects are accomplished by a network image scanning system which includes a client computer and a scanner server computer connected by a network, the server computer having the scanner connected thereto. According to a first aspect of the invention, a virtual TWAIN driver is utilized by an application-program running in the client computer. The virtual TWAIN driver allows the application program to act, to a certain extent, as if the client computer is directly connected to an image scanner, even though the scanner is connected to a scanner server, the scanner server being connected to the client computer over a computer network. The virtual TWAIN driver interfaces with a client protocol encoder/decoder within the client computer. Commands and information are communicated over the computer network between the client and scanner server.

Within the scanner server, there is a server protocol encoder/decoder which is utilized to receive and transmit commands and information including image files and image information to the client computer. The scanner server includes an application program which interfaces between the server protocol encoder/decoder and a TWAIN driver. The TWAIN driver communicates with a scanner, such as a SCSI scanner, through a SCSI interface within the scanner server and an SCSI bus.

In order to properly communicate commands and information including control information and image information between the client computer running the application software and the scanner server computer, commands and data are communicated between the client computer and scanner server computer in accordance with a protocol utilized by the invention. The invention includes the commands and packet structure which are communicated between the client computer and scanner server.

Whenever there is an open communication session between the client computer and scanner server, an entry describing connection information is created in a process ID table which is stored in the scanner server computer. For the scan-to-application aspect of this invention, a table is utilized within the scanner server computer which includes information about the client computer and the executing process such as the thread ID, the machine name, the client address, the image file name, and scanning parameters.

Because the invention allows a device on a network to control and communicate with an application program running on the client computer and because the scanner server is able to write information to a local disk of the client computer, security of the client computer is a concern. The security concern is solved by the use of the commands utilized by the invention which are encoded into network packets. Most of these commands originate from the client computer and therefore, are assumed to be authorized by the client computer, thus preventing security problems. The commands which do not originate from the client computer originate from the host computer after the user, or software, has taken steps to register the client computer with the scanner server. In this manner, the client computer will only accept the commands (and accompanying data) from the scanner server after the client computer has performed a registration process with the scanner server. The commands utilized by the scan-to-application aspect of this invention include open session, close session, read scanner parameters, set parameters, terminate scanner job, and read file, each of which originates from the client computer. The commands further include corresponding acknowledgements which are transmitted from the scanner server to the client computer.

In accordance with a second aspect of this invention, referred to as the scan-to-file operation, instead of transferring image information from the scanner server to an application program running in the client computer, an image file is transferred from the scanner server to a storage medium of the client computer. The client computer can then access this image file which is locally stored or stored on a medium which is locally mapped as a network drive by any type of image processing software or can simply store or further transfer the image file.

In the scan-to-file aspect of this invention, there is a file storage medium within the client computer, a client protocol encoder/decoder which encodes and decodes commands and information transmitted between the client and server, and a program called a file catcher which registers the client computer with the server so that the server will be able to transmit files to the client computer, and also controls the receiving and storage of image files. The scanner server is connected to the client computer by any type of network and includes a server protocol encoder/decoder, scan task software which controls the operations of the scanner connected to the scanner server, a TWAIN driver and a scanner interface.

The scan-to-file aspect of this invention operates by first registering the client computer with the scanner server. The user can then go to the scanner server and select the client computer which is to receive the generated image file. An image is scanned at the scanner which is connected to the scanner server and the image file is transmitted to the client to the computer. When the client computer receives the file, the file is stored on a local storage medium of the client computer.

The scanner server includes a table which registers active processes between the client and scanner server and also includes a table which registers machines to which image files can be transferred. The table listing the available machines is called the machine name table and contains an index, a machine name field, and a client address field for each entry. As with the scan-to-application aspect of this invention, special network scanning commands are transmitted between the client and server for the scan-to-file operation including the open and close session commands, an initialize session command, a terminate session command, and corresponding acknowledge commands. Another scan-to-file command, the read file command, is transmitted from the scanner server to the client computer in order to transfer the image file to the local computer. There is also a corresponding acknowledge command transmitted from the client computer to the scanner server.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7A–7L illustrate the format of communication packets utilized by different commands used with the scanning process;

FIGS. 8A–8E illustrate a flowchart used for the scan-to-application process;

FIG. 11 illustrates an image of a computer screen which allows a user to select one of a plurality of scan-to-application jobs at the scanner server;

FIG. 12 illustrates a machine name table which is utilized to keep track of client computers which are capable of accepting image files from the scanner server for the scan-to-file aspect of the invention;

FIGS. 13A–13F illustrate packets used to communicate commands and information for the scan-to-file process;

FIGS. 14A–14D are a flowchart of the scan-to-file operation;

DESCRIPTION OF THE PREFERRED EMBODIMENTS

Figure 1:
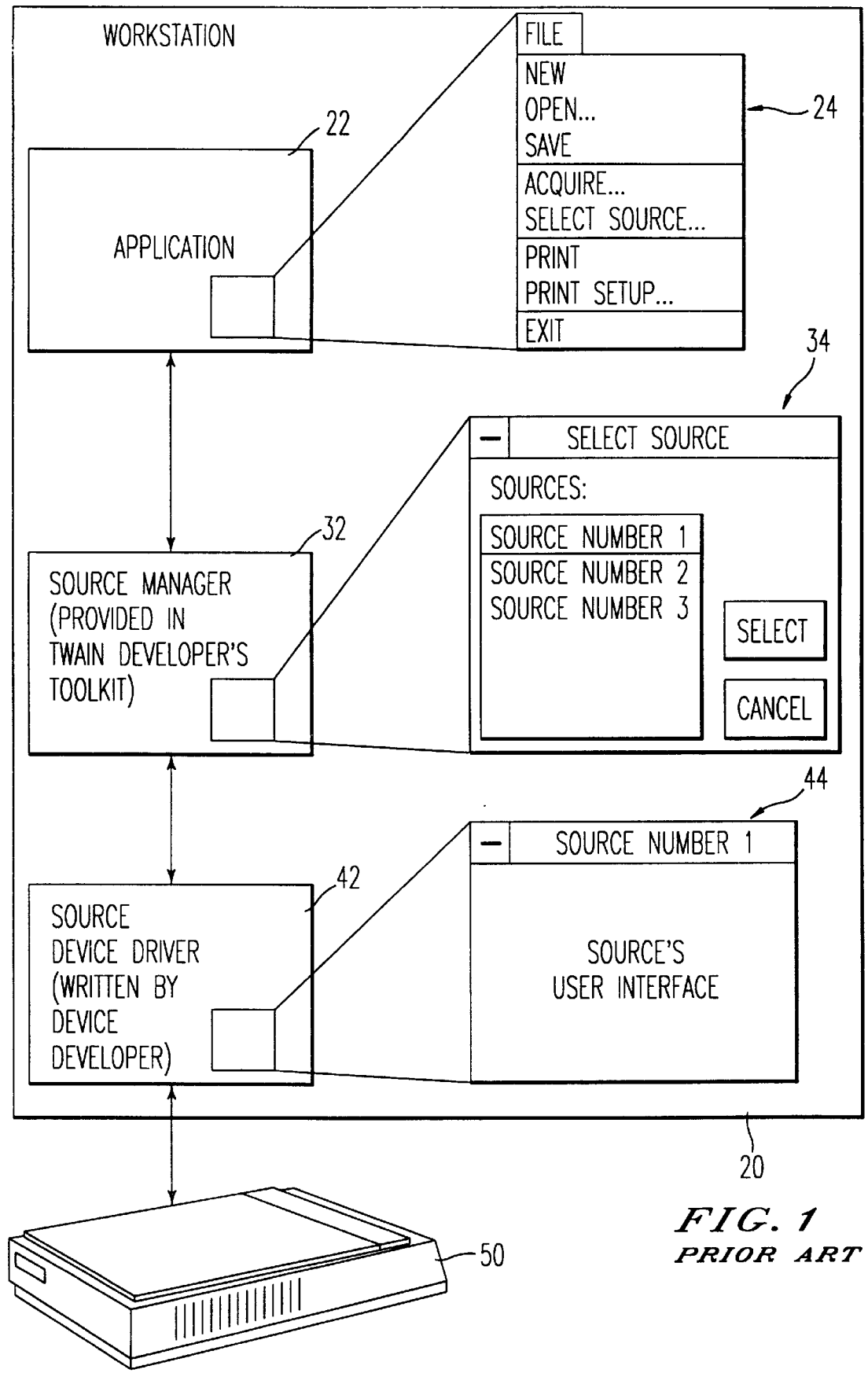
FIG. 1 illustrates a conventional computer workstation connected to an image scanner, the workstation executing an application program which uses a TWAIN driver.

Referring now to the drawings, wherein like reference numerals designate identical or corresponding parts throughout the several views, and more particularly to FIG. 1 thereof, there is illustrated the software components of a conventional TWAIN application running on a workstation 20 (e.g., a computer) connected to a scanner 50. The preferred embodiment of the present invention has been developed using known information pertaining to the use of TWAIN so before proceeding with a detailed explanation of the invention, an explanation of how TWAIN compatible application programs operate is provided.

As illustrated in FIG. 1, the workstation 20 contains three major software components; an application program or software 22, a source manager 32, and a source device driver 42. The application software 22 includes any type of application program which inputs or acquires images from a scanner or other image acquiring device. The application software 22 includes a pull-down menu 24 which includes various options including an option to acquire an image (e.g., scan an image), and an option to select a source of the images. The application software 22 is written by the application software developer in order to be compatible with the TWAIN standard. The TWAIN standard defines a standard software protocol and API (application programming interface) for communication between software applications and image acquisition devices (the source of the image data).

A source manager 32 is software which manages the interactions between the application and the source of images. The source manager software is software code which is provided in the readily available TWAIN Developer's Toolkit and allows the management or selection of different sources of images. The source manager 32 includes software which provides a menu 34 which allows the user to select a source of images. The source software or source device driver 42 is software which controls the image acquisition device and is written by the device developer to comply with TWAIN specifications. The source device driver 42 includes a source user interface 44 which allows control of the scanner 50 including the control of the parameters of the scanner 50. The source device driver 42 is usually written by the manufacturer of the scanner 50. The source device driver 42 may be installed in a manner which is analogous to installing a print driver in a windows based computer. Further information about TWAIN is disclosed in the manual entitled TWAIN, Linking Applications and Images which defines the TWAIN standard, Release v1.6, November 1995, which is incorporated by reference, although other versions of the TWAIN standard can be utilized with the invention.

Figure 2:
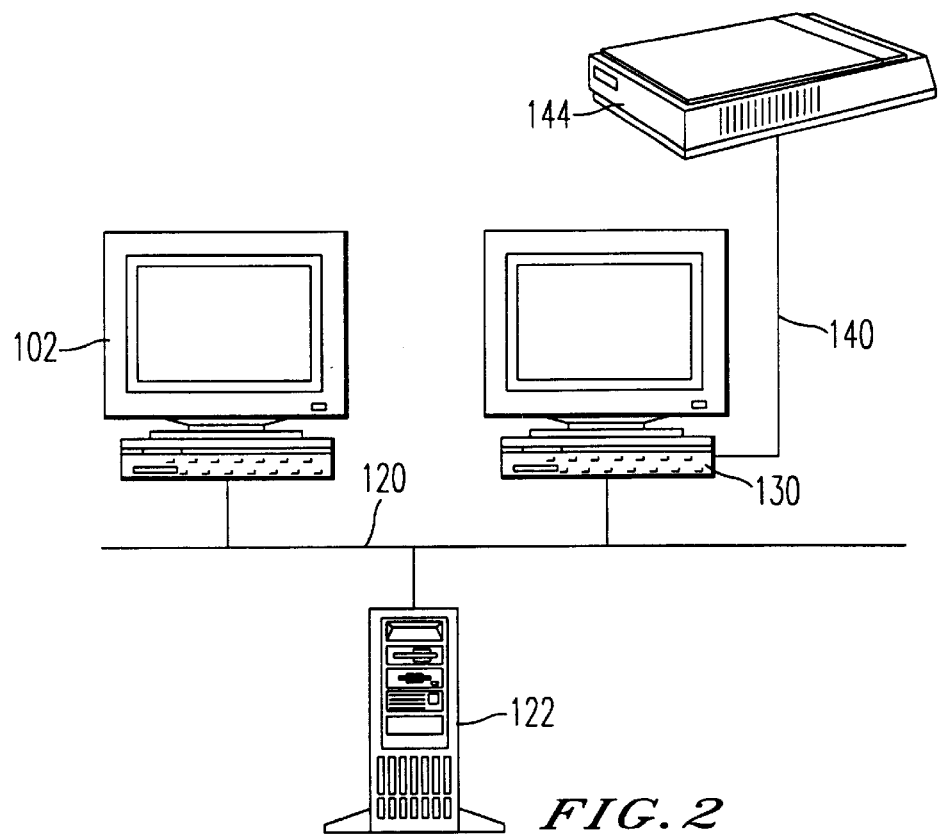
FIG. 2 illustrates a client computer, a scanner server which is connected to an image scanner, and a file server, each connected by a computer network.

FIG. 2 illustrates a client computer 102, a scanner server computer 130, and a file server computer 122, each connected by a computer network 120 which are utilized by the invention. The scanner server computer 130 is connected to a scanner 144 via a bus or cable 140. Preferably, the bus 140 is a SCSI (Small Computer System Interface) bus or cable, although any suitable communication line, device, or method may be used to communicate between the scanner 144 and scanner server computer 130. The scanner 144 can be implemented using any scanner including Ricoh models 510 or 520, for example. Also connected to the network is a file server 122 which can be any type of computer which stores files. However, it is to be noted that the file server is not needed to perform the transfer of images from the scanner server computer 130 to the client computer 102. Each of the elements illustrated in FIG. 2 are connected by a network 120. Therefore, the client computer 102 and the scanner server 130 include network interfaces such as network interface cards.

This network 120 may be implemented as any type of network such as a Novell network or local area network (LAN) in which the computers utilize NetWare by Novell as a network operating system using the SPX/IPX (Sequence Packet Exchange/Internetwork Packet Exchange), a Microsoft based network configured for SPX/IPX or TCP/IP, or may be implemented using the TCP/IP (Transmission Control Protocol/Internet Protocol) which is a popular networking protocol for use on the Internet and also for most UNIX implementations. Further information on Novell NetWare and SPX/IPX is available in CDROM format from Novell on a disc entitled, "NetWare 4, Green River Documentation", Developer Beta, which is incorporated herein by reference. Information on TCP/IP is available from the books "Internetworking with TCP/IP", Volume II, Design, Implementation, and Internals, 1991, and Volume III, Client-Server Programming and Applications, 1993, each by Douglas E. Comer and David L. Stevens and published by Prentice-Hall, both of which are incorporated herein by reference.

A wide area network (WAN) may also be used with the invention. Further, other networks such as a network used with Apple Computers, such as the Apple Talk network, or any other type of network including the Internet may be utilized with the invention. When a WAN or the Internet is utilized by the invention, the client and/or scanner server computers may be first connected to a LAN. The invention further includes the use of wireless networks such as infrared, or radio frequency networks. If desired, a printer or print server and printer can be connected to the network 120 to print images from the client computer 102.

In the preferred embodiment of the invention, the scanner server computer is an IBM compatible computer such as an X-86 (e.g., 80586), Pentium or Pentium-Pro based machine running Windows '95 from Microsoft and the client computer 102 is also an IBM compatible computer such as a Pentium based computer running Windows '95 or Windows NT. However, the invention can be implemented by any other type of computer including Apple Macintosh computers, any Motorola processor based computer, a Sun Microsystems computer, a computer running a Unix based operating system, or any other computer running any type of operating system.

Figure 3:
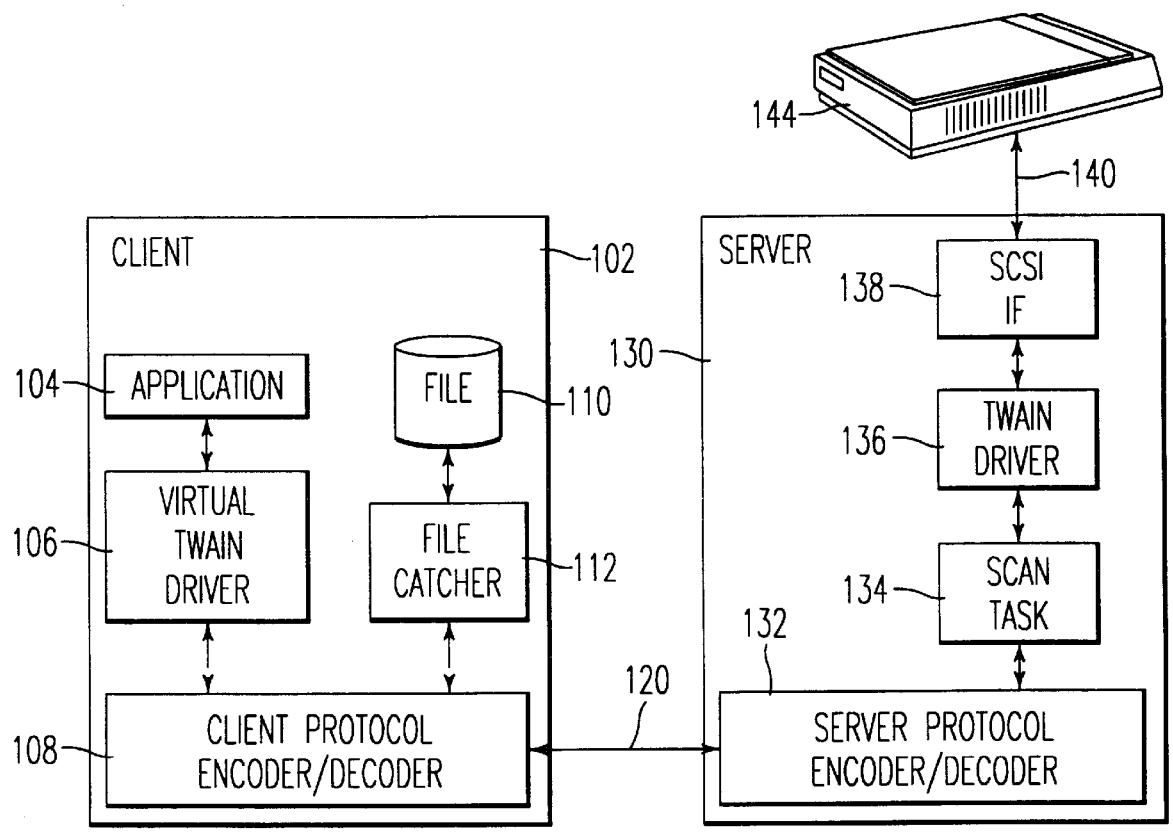
FIG. 3 illustrates the software components and further details of the client and scanner server computers illustrated in FIG. 2.

A functional block diagram of the software and other components illustrated in FIG. 2 is set forth in FIG. 3. The client computer 102 includes an application program 104 such as a program which acquires images. The application program may also process the image data which is acquired. The application program 104 is any commercially available application program which acquires images, and in the preferred embodiment of the invention, is TWAIN compatible, although this is not necessarily required. When the application program 104 is TWAIN compatible, no modifications are needed to the application program for the scan-to-application aspect of this invention because of the use of an easily changeable image acquiring device driver or scanner device driver. Within the application program 104 is included source manager software (not illustrated) which is conventional in nature and has been described with respect to the source manager software 32 illustrated in FIG. 1. The application program software 104 communicates with the scanner server computer 130 utilizing a virtual TWAIN driver 106 which interfaces with the application program 104. The virtual TWAIN driver 106 is a software element which constitutes part of this invention and is used to implement the functions described in the flowchart for the scan-to-application aspect of this invention illustrated in FIGS. 8A–8E.

At the present time, there is no known LAN operating system which supports network scanning operations by an application or other program executing on a client computer. Therefore, in order to implement the invention, it was necessary for the inventors to develop software to support network scanning applications. The present inventors have developed a networking protocol which they call the Ricoh Workgroup Protocol (RWP) to support network scanning. This protocol is a command/response protocol which utilizes a connection-oriented protocol or connectionless protocol provided by the LAN operating system such as TCP/IP, or SPX/IPX, or any other protocol. The protocol which has been developed and utilized by the present invention, and explained in detail below is implemented using a client protocol encoder/decoder 108 which carries out the software operation of encoding and decoding command packets transmitted over the network 120.

The security of the client computer 102 including security of the files and storage space thereof is a concern as the network server computer 130 is allowed to write information onto the local storage medium of the client computer 102 and interface with the application program executing on the client computer 102. In order to solve this problem of network security at the client computer 102, the protocol which has been developed to be used by the present invention has the requests and commands initiated at or by the client computer 102. Therefore, unless the client computer 102 initiates an operation or registers with the scanner server 130, the scanner server 130 does not have access and cannot store data in or write data to the client computer 102. The client protocol encoder/decoder 108 transmits and receives packets encoded in accordance with the Ricoh Workgroup Protocol described below with respect to FIGS. 7A–7L and 13A–13E, or any other desired protocol, which are encapsulated within the selected transport protocol. It is the responsibility of the client protocol encoder/decoder 108 to encode and decode the protocol packets.

The virtual TWAIN driver 106 and client protocol encoder/decoder 108 translate the TWAIN API calls into requests which are compatible with the protocol described below with respect to FIGS. 7A–7L. These commands are placed into packets as illustrated in FIGS. 7A–7L and transmitted to the scanner 130 for service. The commands which are transmitted from the client protocol encoder/decoder 108 over the network 120 to the scanner server 130 are received by the server protocol encoder/decoder 132 which decodes the received packets. It is to be noted that the network communication is peer-to-peer which is transparent to the network file server 122.

Scan task software 134 within the scanner server 130 is software executing within the server 130 which controls the scanning operations for both the scan-to-application operation and the scan-to-file operation. The functions performed by the scan task software 134 are described with respect to the flowcharts in FIGS. 8A–8E and FIGS. 14A–14D. The scan task software 134 communicates with the scanner 144 through a TWAIN driver 136 which controls the communication to the scanner 144. The TWAIN driver 136 may be implemented using any conventional TWAIN driver. The scanner 144 interfaces to the scanner server 130 using a SCSI interface 138 through a SCSI connecting cable or bus 140. It is to be noted that while a scanner is illustrated in the present invention as the device used for acquiring images, any type of device which is capable of acquiring images can be utilized in place of the scanner 144, including TWAIN compatible devices which may be conventional such as a digital camera, a flatbed scanner, a scanner which includes an automatic sheet feeder, or any type of device and/or software which is capable of acquiring image information or data. The image acquiring device will usually use a CCD (charge coupled device), although this is not required.

The client computer 102 further includes file catcher software 112 which is utilized by the scan-to-file operation of the present invention. The scan-to-file operation allows the client computer 102 to inform the scanner server computer 130 that it is available to accept image files and control the storage of received image files. Subsequently, when a user goes to the scanner server and scans a document using the scanner 144, the resulting image file is transferred over the network 120 through the client protocol encoder/decoder to the file catcher 112 which writes the file into a storage device 110. The storage device 110 is any type of storage device including conventional storage devices such as disks including magnetic disks, optical disks, magneto-optical disks, a tape, a magnetic card, a semiconductor memory such as a DRAM or a SRAM, or any other type of suitable image storage device. Further the storage device 110 may be equivalently implemented by mapping a network drive of a file server or other computer as being local to the client computer 102.

The present invention uses data bases or tables to store information which is utilized in order to keep track of parameters, addresses, and other information of a scanning process. When the client computer 102 initiates communication for scanning purposes with the scanner server computer 130, the scanner server computer stores therein (e.g., on any storage device such as a hard disk or a rewritable semiconductor memory), a process ID table such as the process ID table 150 illustrated in FIG. 4 containing an entry for each open or active process. The system uses the process ID table during shutdown to notify each active process of an impending termination. This notification enables each process to release resources and exit cleanly.

The process ID table 150 includes two fields; an index field 152 which is an integer which identifies a unique table entry of a process. This integer can be assigned in any desired manner and a simple manner of assigning this index is sequentially. A process ID field 154 is used in the preferred embodiment of the invention to store an actual Windows '95 process ID of the executing thread, although any other type of process ID can be stored in the field 154.

Figure 5:
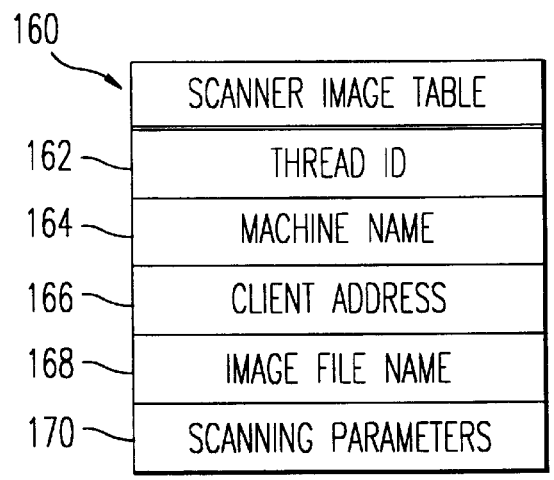
FIG. 5 illustrates a scanner image table which is used to register scan-to-application processes at the server.

During a scan-to-application process, a scanner image table 160 illustrated in FIG. 5 is created. The scanner image table 160 has a primary purpose of managing scan-to-application clients. The scanner image table 160 contains elements which are utilized to identify and process multiple scan-to-application clients. A separate entry is maintained for each client-server connection.

The scanner image table 160 includes a thread ID field 162 which a numeric field which contains the Microsoft process ID of the server thread providing scan-to-application services for the client. The thread ID is used for inter-process communications, e.g., "Windows messages" or a dialog box, to signal a process concerning event changes. While the thread ID field 162 has been described with respect to a Microsoft environment, this invention is not limited to the use of Microsoft software and other software using appropriate thread ID information can be utilized. A thread is a program module or a group of small program modules which execute in parallel with their own data context.

The scanner image table 160 includes a machine name field 164 which is a character string which contains the name of the client workstation. This name is presented to the user during the scanning operation at the server, thus allowing the user to identify his client connection and ensuring that the scanned image will be transported to the correct client workstation.

A client address field 166 of the scanner image table 160 is the network address of the client workstation and utilized in order to carry out network communications. The client address field also includes the port of the client, also referred to as a software port, which is a discriminator indicating the application program or software related to the network communication. The port is stored as the last two bytes of the client address. An image file name field 168 stores a temporary file name of the scanned image located on the server. This image file name is the name of the file which will be transported across the network to the client computer during the scan-to-application aspect of the invention. Last, the scanner image table 160 includes a scanning parameters field 170 which is an array of scanning parameters which are set for the client. The scanning parameters field 170 allows the user to set the scanning parameter from the client computer and when the scanning is performed at the server computer, the scanning is performed in accordance with the scanning parameters set in the table 170. It is to be noted that the fields and information which are utilized are grouped into specific tables in the preferred embodiment of the invention. However, the grouping of the fields can be changed, as desired, as long as the required information is stored.

As previously described with respect to FIG. 3, commands and information are transmitted between the client computer 102 and the scanner server 130 using protocol packets. The packets transmitted in accordance with the protocol developed by the present invention include a header structure or packet header; illustrated generically in FIG. 6, and a data portion. The header is used by clients in the server for session management and control, and the data portion contains network session data and is generally used to transmit the machine name, network address, scanner parameters, and image data. Many of the commands utilized by the invention do not transport data and accordingly, only the packet header structure is transmitted for these commands. The packet header, as illustrated in FIG. 6, utilized by the present invention is a fixed length data structure which is the first item in the data portion of a transport packet.

The routing of the packet header over the network 120 between the client computer 102 and the scanner server 130 is performed in accordance with known or conventional network transport protocols or mechanisms by the transport layer of the network. This is why source and destination addresses are not needed in the packet header of FIG. 6.

Figure 6:
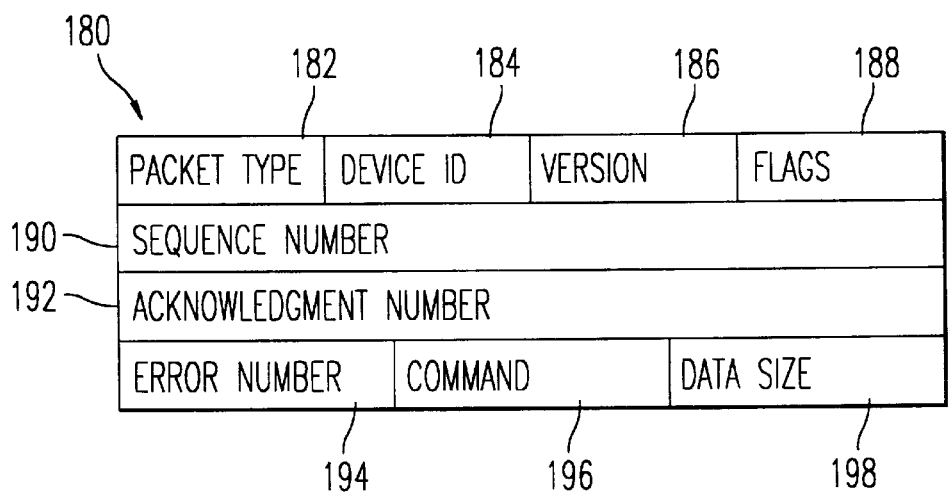
FIG. 6 illustrates the generic format of a packet used to communicate commands and information between the client and server computers.

In the packet header 180 illustrated in FIG. 6, the first field is a packet type 182 which is a numeric descriptor which identifies the structure of the packet. In the present invention, the packet type for each command is "RWP_PACKET_TYPE" or the associated numeric value. At the present time, the invention is implemented using only this type of packet although other packet types may be utilized in the future. The length of the packet type field 182 is 8 bits.

A device ID field 184 is an eight bit numeric descriptor which identifies the type of machine or function which is to utilize the packet. In the current version of the present invention, there is only one defined device ID which is "Ricoh Network Scanner" (or Ricoh Network Scanner Software) and each packet will have such a device ID. However, other device identifiers may be used in future expansions of this invention.

Field 186 of FIG. 6 is an eight bit field which is a numeric field and is used to identify the current version of the protocol used by the invention. At the present time, there is only one version defined, the first version, but future versions of this invention may evolve and support additional feature sets.

A flags field 188 is an eight bit field in which individual bits identify different protocol states. Bit 0 is used to indicate an error in successfully transmitting a packet from the client computer to the scanner server. During file transfer from the scanner server to the client computer during the scan-to-application process, bit 1 is used to indicate that the information accompanying the packet header is the end of the file and bit 2 is used to indicate the end of a page of image information. Bit 3 is used to indicate that a sequence error has occurred and is used to request the transmitting entity to retransmit the packet which was not properly received. Each of the protocol commands uses the bit 0 and bit 3 flags and in FIGS. 7A–7L and 13A–13F, when the flags field indicates none, there are no special flags for this particular command, but the bit 0 and bit 3 flags are used.

A sequence number field 190 contains a 32 bit number which identifies the current packet. Since communication is bi-directional, both the sender and receiver maintain separate sequence numbers depending upon the direction of flow of the packets. Each packet which is transmitted contains a sequence number which has been incremented by one as compared to the previous packet. An acknowledgement number field 192 is a 32 bit field which indicates the identity of the last error-free packet which was received.

An error number field 194 contains an error number which is examined when bit 0 of the flags field 188 indicates an error. The error number field 194 indicates the specific type of error associated with flag bit 0 and is 8 bits long.

A command field 196 is an 8 bit numeric field which indicates the command or response associated with the packet. The various commands and corresponding acknowledgements or responses are illustrated respectively in FIGS. 7A–7L and include open session, open session acknowledge, close session, close session acknowledge, read scanner parameters, read scanner parameters acknowledge, set parameters, set parameters acknowledge, terminate scanner job, terminate scanner job acknowledge, read file, and read file acknowledge. These commands are used with the scan-to-application aspect of this invention. The scan-to-file aspect of this invention utilizes the open session, open session acknowledge, close session, close session acknowledge, and the commands which are illustrated in FIGS. 13A–13F which include initialize session, initialize session acknowledge, terminate session, terminate session acknowledge, get storage file, and get storage file acknowledge.

Last, a data size field 198 is a sixteen bit field which contains the size of the variable length data which follows the packet header illustrated in FIG. 6.

The packet header structure illustrated in FIG. 6 is constructed in accordance with the preferred embodiment of the invention. However, it is possible for the order, size, and information contained within the fields to be changed as desired. Therefore, it is to be understood that fields in the packet header can be deleted, and added, as long as the desired functionality is achieved. The packet header illustrated in FIG. 6, is stored in a memory, such as a buffer memory implemented using RAM such as SRAM or DRAM or any other type of memory, both at the client and scanner server computers, before and after the packet header is transmitted. A part of the present invention includes the communication protocol as defined by the packet header structures.

The packet type, device ID, version, sequence number, and error number flags are the same in the packet headers illustrated in FIGS. 7A–7L and 13A–13F, and therefore, a description thereof will not be provided for brevity as these fields have been described with respect to FIG. 6. Further, the flags field for many of the commands uses only bit 0 which indicates an error in successful transmission of a packet and bit 3 is utilized to indicate an acknowledgement error. Unless bits 1 and 2 which indicate the end of file or end of page are utilized, a description of the flags field in FIGS. 7A–7L and 13A–13F will also have the description of the flags field omitted.

The packet headers of FIGS. 7A–7L are utilized to transmit the protocol commands of this invention. Therefore, the packet headers of FIGS. 7A–7L are also referred to as protocol commands or commands.

FIG. 7A illustrates the structure of the packet header 200 for the open session command. The open session command packet header 200 begins with the packet type field 202 indicating the packet is for a RWP_PACKET_TYPE, and therefore is for the Ricoh Workgroup Protocol described above. The device ID field 204 indicates that the packet is used for communication with a Ricoh network scanner system. The version field 206 indicates that the version of the packet protocol is 1. There are no special flags for the open session command packet header in field 208 so the flags which can be utilized in this field are flags 0 and 3, described above. The sequence number field 210 and acknowledgement number field 212 are set in accordance with the previous communications which have occurred. The error number field 214 is utilized to indicate an error when flag 0 of field 208 is set. However, in this case, no errors have yet been set so the error number field is set equal to zero. The command field 216 indicates that the command is for an open session. The data size field 218 contains data indicating the size of the machine name of the client computer and also the size of the network address of the client computer. The packet header illustrated in FIG. 7A is followed by data which indicates the machine name of the client computer and the network address of the client computer. Alternatively, when the open session command originates from the scanner server 130 as is done for certain aspects of the scan-to-file aspect of the invention, the data size will contain the size of information of the scanner server which follows the open session packet header.

FIG. 7B illustrates the packet header structure for the open session acknowledge command which is transmitted from the computer which receives the open session command. The command field 236 of this packet indicates that the command is the open session acknowledge command. The open session acknowledge command is transmitted from the scanner server 130 to the client computer 102 (or vice-versa) to indicate that the open session command was successfully received by the scanner server computer 130 and that all necessary operations to perform the opening of the session have been successful. There is no attached data associated with the open session acknowledge command.

FIG. 7C illustrates the packet header structure for the close session command. In the packet header 240, the command field 256 indicates that the packet header is for the close session command. There is no data which follows the close session packet header 250 so the data size field 258 of the close session packet header 240 is zero.

FIG. 7D illustrates the close session acknowledge packet header structure 260 which has the command field 276 set to indicate that the packet header structure is for the close session acknowledge command. This packet header is transmitted from the computer receiving the close session command to indicate that the session pertaining to the scanning operation has been successfully closed. As no data follows the close session acknowledge packet header, the data size field 278 of the packet header 260 is set equal to zero.

FIG. 7E illustrates the packet header structure 280 for the read scanner parameters command. In the packet header 280, the command field 296 indicates that the packet header is for the read scanner parameters command. The data size field 298 is set equal to zero, indicating that no data follows this packet header. The read scanner parameters command is transmitted from the client computer 102 to the scanner server computer 130 to indicate that the client computer 102 desires to determine the content of the scanner parameters presented to the user at the client computer. This includes options of the scanner and the permissible range of settings for the scanner parameters.

FIG. 7F illustrates the packet header structure for the read scanner parameters acknowledge command. In the packet header 300, the data size field 318 contains the size of the scanner parameters table which follows the read scanner parameters acknowledge packet header which is transmitted from the scanner server 130 to the client computer 102. The scanner parameters table is a data structure which contains the current parameters of the scanner including the ranges and possible settings of the scanner or image obtaining device. The parameters include, for example, the parameters illustrated in FIG. 10 which are discussed below. In the case where the client computer is not aware of the permissible range of scanner parameters, it will be necessary for the client computer to be informed of the different parameter settings or capabilities of the scanner or image obtaining device. This is accomplished by including the possible settings or range of settings of the scanner parameters within the scanner parameter table transmitted with the read scanner parameters acknowledge command. Alternatively, a separate command and corresponding command protocol header can be used to read the range of scanner settings which is transmitted from the client to the server. The corresponding acknowledge command contains the data defining the ranges and possible settings of the scanner or image obtaining device. In this alternative arrangement, the scanner parameters table includes only the current scanning parameters which are to be utilized. If desired, the scanner server continuously maintains a table for each user or client computer which contains the user's desired settings. This table can be used for both the scan-to-application and scan-to-file aspects of this invention.

When the client computer desires to set the scanning parameters used for the scan-to-application procedure, the set parameters packet header 320 illustrated in FIG. 7G is transmitted from the client computer to the scanner server computer. The data size field 338 is set to the size of the scanner parameters table which is being transmitted. The data containing the scanner parameters table follows the packet header 320.

After the scanner server receives the packet header 320 which is used to set the parameters, the scanner server computer transmits the set parameters acknowledge packet header 340 illustrated in FIG. 7H to the client computer.

If after the client computer sets up a scan-to-application procedure and the user wishes to cancel the scan-to-application procedure at the client computer, the user clicks on the appropriate cancel command on an image display at the client computer 102 which causes the terminate scanner job packet header 360 illustrated in FIG. 7I to be transmitted from the client computer 102 to the scanner server computer 130. In the packet header 360, the data size field contains the size of the machine name of the client. The data which follows the terminate scanner job packet header 360 is the name of the client computer 102.

After the scanner server computer 130 receives the terminate scanner job packet header 360, the scanner server computer 130 transmits back to the client computer a terminate scanner job acknowledge packet 380 illustrated in FIG. 7J.

FIG. 7K illustrates the read file packet header 400. After the client computer 102 sets the scanning parameters and the user indicates that it is desired to begin the scanning operation, the client computer 102 transmits the read file packet header to the scanner server computer 130. The data size field 418 contains the size of the machine name or client computer name and the data which follows the packet 400 is the machine name.

When the user begins the scanning operation at the scanner server, the images are transmitted from the scanner server computer 130 to the client computer 102 using the read file acknowledge packet header 420 illustrated in FIG. 7L. In the flags field 428 of the packet header 420, bit 2 indicates that the data following the packet header includes the end of a page of image data and bit 1 is utilized to indicate the end of the image file. The data size field 438 indicates a size which is equal to the maximum packet size which is to follow minus a quantity including the size of the packet header plus the size of the file data to be transmitted. As the image data might be quite lengthy, the image or file data is transmitted in a plurality of packets, each having a corresponding packet header.

FIGS. 8A–8E are a flowchart illustrating the scan-to-application aspect of the invention. With this aspect of the invention, the user is able to control various aspects of the scanning operation from within the application running on the client computer 102, as if the scanner were directly connected to the client computer 102, for example using a SCSI bus. However, the actual scanning is performed at the scanner server computer 130.

In FIG. 8A, after starting, the software utilized by the present invention is installed on both the client computer 102 and the scanner server computer 130 in step 450. In the client computer, the software is installed as a TWAIN compatible device driver. As the device driver allows functions such as setting the scanner parameters to be performed as if the scanner were directly connected to the client computer, the device driver is referred to as a virtual TWAIN device driver. Also installed on the scanner server computer is the software used to carry out the scanning operations. Referring to FIG. 3, the software utilized by the scan-to-application operation includes the virtual TWAIN driver 106, the client protocol encoder/decoder software 108, the server protocol encoder/decoder software 132, the scan task software 134, and the TWAIN driver 136. The application software 104 which is utilized during the scan-to-application software is preferably any TWAIN compatible software which utilizes the virtual TWAIN driver 106.

Figure 9:
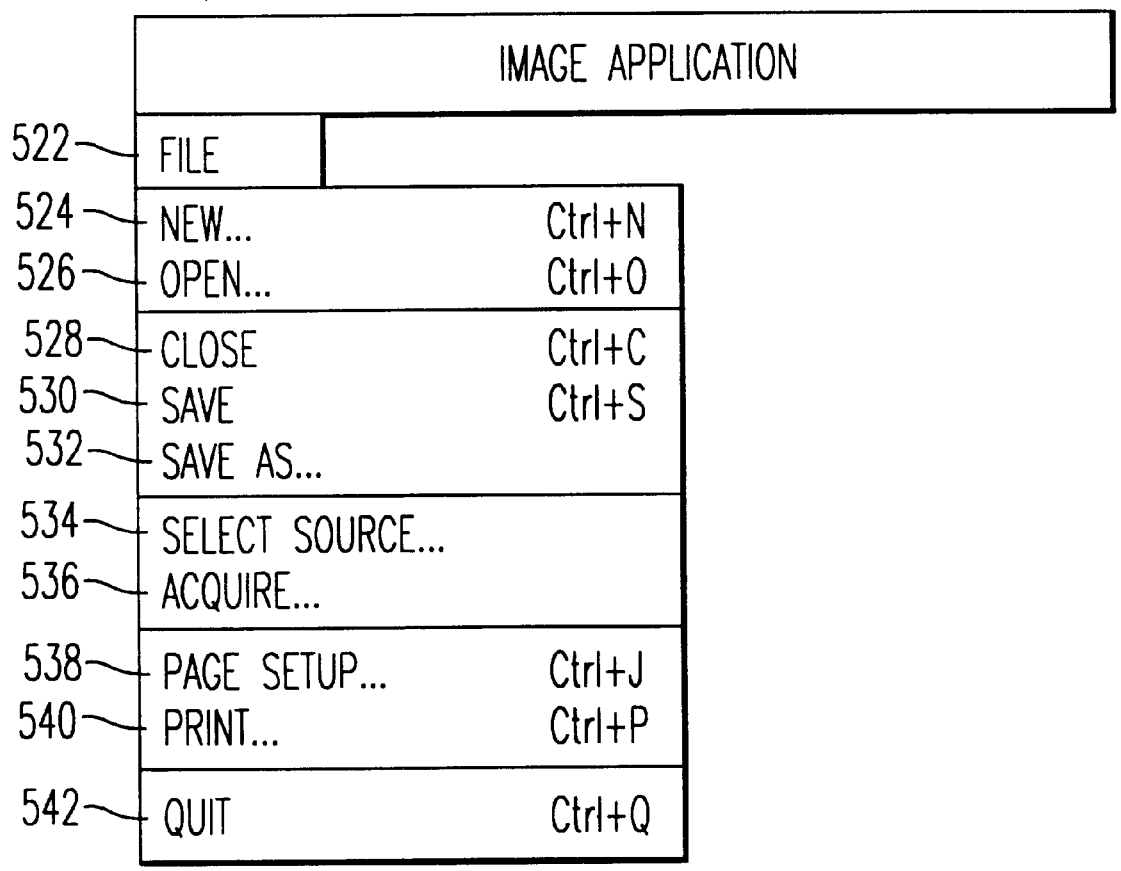
FIG. 9 illustrates a pull-down menu which appears in TWAIN compatible windows based image applications.

After the software is installed on the client and server computers, using a standard TWAIN interface in the application software, the user selects the network scanner as the source of images in step 452 using the pull-down menu illustrated in FIG. 9. The pull-down menu 520 illustrated in FIG. 9 contains conventional graphical user interface commands and a select source command 534 which is utilized by the user at the client computer 102. After the user selects the select source command 534 illustrated in FIG. 9, a subsequent menu is displayed (not illustrated) which allows the user to select from one or more installed device drivers. In the case of the scan-to-application operation using the network scanner, the user would select the network scanner as the source of images.

When the user is ready to obtain images, the user requests the scanning operation to begin in step 454 utilizing the acquire command 536 illustrated in FIG. 9. At this time, the client computer determines if there is an available workgroup scanner on the network. There are various ways in which the client computer can determine if there is a scanner server available on the network and exemplary manners of how to determine if there is an available network scanner are described below.

Depending on the type of computer network 120 which is utilized by the present invention, different types of procedures can be performed to determine whether there is an available workgroup scanner on the network 120. When the network 120 is implemented using Novell NetWare, two methods of determining whether a scanner server exists on the network can be performed. A first method which can be used with the SPX/IPX protocol of Novell Netware has the client computer monitor Service Advertisement Protocol (SAP) packets which are transmitted by the various servers available on the network including the scanner server 130. These SAP packets are transmitted by each server approximately every 60 seconds in order to advertise the availability of the network servers. If this procedure is utilized by the client, it will be necessary for the client computer to monitor the existence of SAP packets from the scanner server 130. The SAP protocol also allows an inquiry request relating to available network services to be transmitted by a client which is responded to by a server. This inquiry mechanism is how client computers of the preferred embodiment of the invention determine the availability of network scanner servers.

A second method of determining whether the scanner server computer 130 is available on the network using the Novell network system is for the file server 122 illustrated in FIG. 2 to maintain a NetWare bindery or directory at the file server 122 of all servers which are available on the network. As the file server 122 maintains a directory of all available servers, the client computer 102 merely has to examine the information stored within the file server 122 to determine the network scanner server(s) which is (are) available on the network.

The present invention is also implemented for use with TCP/IP networking which is commonly used by both UNIX systems and the Internet. The implementation using TCP/IP has an entity or person, such as a network administrator, register on the client computer a table defining the available network services including the scanner server 130. When the client computer 102 desires to determine if there are any available scanner servers, the client computer checks a table stored at the client computer in order to determine the available scanner servers. While the above schemes for determining the availability of scanner servers are part of the preferred embodiment of the invention, any other manner of determining the availability of scanner servers can be utilized, as desired.

After step 456 determines whether or not there are network scanners available, step 458 examines the results of step 456. If step 458 determines that a plurality of workgroup or network scanners are available, the user selects in step 460 which of the plurality of workgroup scanners are to be used for the scan-to-application operation. Step 460 can be implemented using a graphical user interface which displays a list of available network scanner servers and the user selects one of the scanner servers from this list. If step 458 determines that there are no available workgroup scanner servers, an error is indicated and the process is exited as a user has indicated that a network scanner is to be used but there are no available network scanners.

Figure 4:
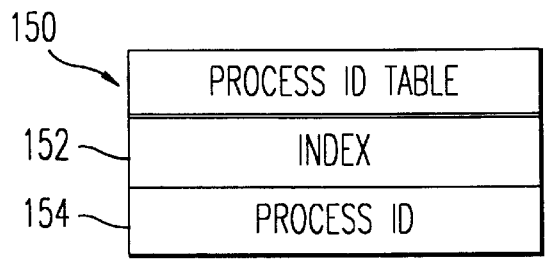
FIG. 4 illustrates a process ID table which is used to register scanning processes which are open for both the scan-to-application and scan-to-file aspects of the invention.

After performing step 460 which selects a workgroup scanner, or when step 458 determines that there is only a single workgroup scanner which is available on the network, flow proceeds to step 462 which transmits an open session command from the client computer 102 to the scanner server 130. The open session command packet header is illustrated in FIG. 7A and along with the packet header illustrated in FIG. 7A is data which is the machine name of the client computer 102 and the network address of the client computer 102. In step 464, the scanner server computer 130 receives the open session command and creates an entry in the process ID table, previously described with respect to FIG. 4, and also creates an entry in the scanner image table, previously described with respect to FIG. 5, for this process which is originating at the client computer 102. The process ID table 150 illustrated in FIG. 4 is utilized to register an open process between the client and server computers, and the scanner image table 160 is utilized to register the details of the scan-to-application operation, including the name and address of the client computer and the scanning parameters which are to be utilized with the scanning process. After performing step 464, the scanner server computer 130 transmits the open session acknowledge command illustrated in FIG. 7B to the client computer 102 in step 466.

Step 468 transmits the read scanner parameters command, the packet header of which is illustrated in FIG. 7E, from the client computer 102 to the scanner server computer 130. Step 470 then transmits the read scanner parameters acknowledge command, the packet header of which is illustrated in FIG. 7F, from the server 130 to the client 102 with the scanner parameters as attached data.

Figure 10:
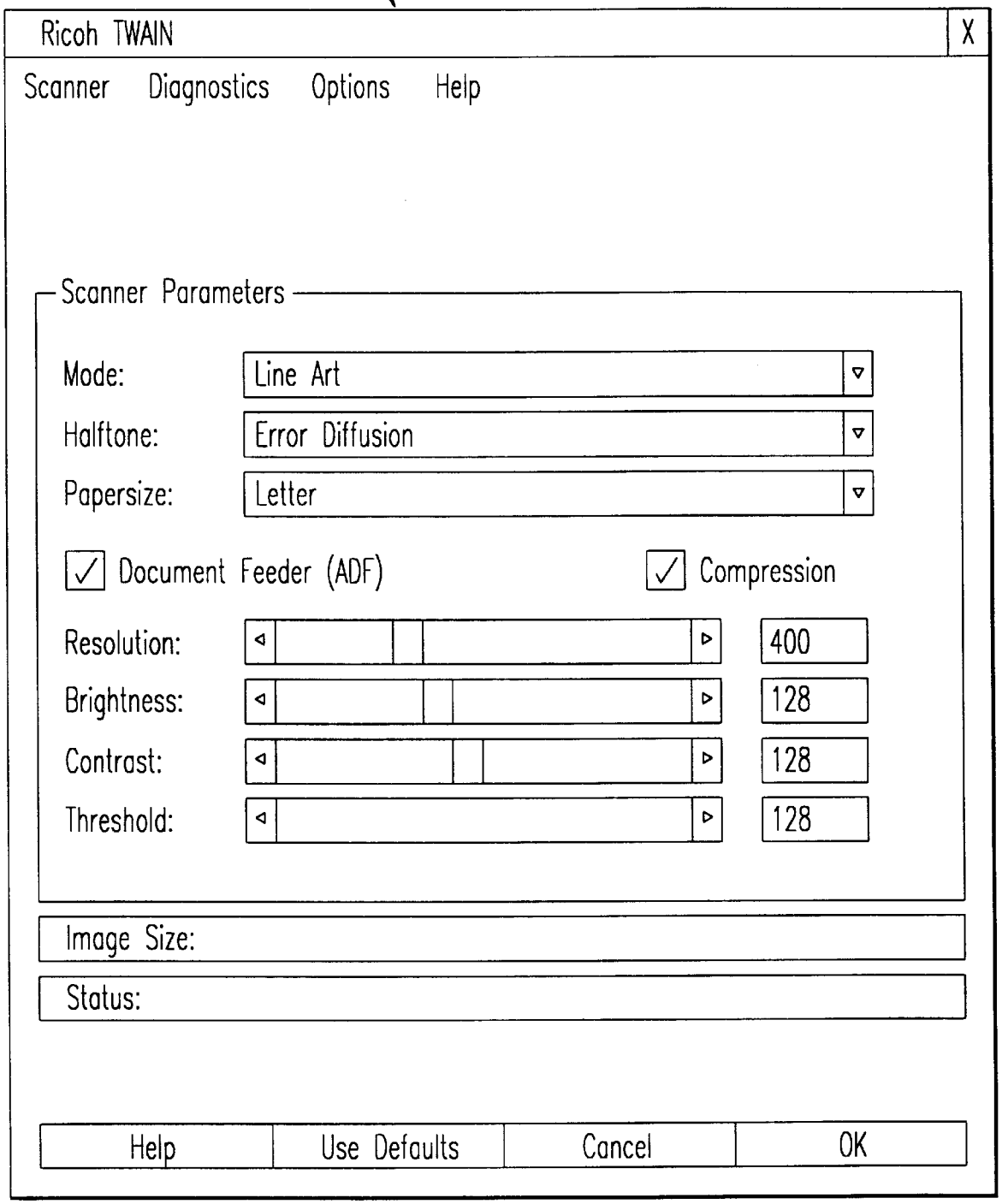
FIG. 10 illustrates an image of a computer screen used to set parameters of scanning.

After step 470, step 472 displays the scanner parameters at the client computer 102 using the virtual TWAIN device driver and allows the user to edit the scanner parameters at the client computer 102. FIG. 10 illustrates an image of a computer screen which allows the user to set the parameters of the scanner. For example, the resolution, brightness, and contrast are set using slidable graphic control buttons. There is no slidable mark illustrated for the threshold so for this particular scanner, it may not be possible to adjust the threshold. Exemplary modes which can be used include line art (e.g., black and white), halftone, 16 level gray scale, and 256 level gray scale. The halftone list box is only utilized when the halftone mode has been selected. In the error diffusion halftone mode, a diffuse random pattern is produced.

Step 474 examines if the user changed any of the scanner parameters. If the scanner parameters were changed, flow proceeds to step 476. It is to be noted that step 476 can be eliminated from the process, if desired, so that there is no checking if the parameters were changed and flow would proceed directly from step 472 to step 476. Step 476 transmits the set scanner parameter command of FIG. 7G with the newly set scanner parameters as attached data from the client computer 102 to the scanner server 130. At step 478, the scanner parameters are stored at the server. Subsequently, the set scanner parameters acknowledge command of FIG. 7H is transmitted from the server to the client computer in step 480, acknowledging that the parameters have been properly set.

From step 480, and when there is a negative answer to the query of step 474, step 482 is performed which transmits the read file command of FIG. 7K from the client computer 102 to the scanner server computer 130 with the name of the client computer attached. The name is utilized at the scanner server 130 to keep track of the various scan-to-application jobs which are registered at the scanner.

Step 484 then instructs the user at the client to begin scanning at the scanner server 130. Step 484 is implemented by displaying a message at the client computer. When the message is a Windows-based graphical message, a dialog box is displayed which also contains a cancel "button". When the user "clicks" on the cancel button at the client computer 102, the scan-to-application process is terminated, as explained below. When displaying the message in step 484 which instructs a client to begin scanning at server, the message can also indicate that the client computer is now waiting for image information to be received from the scanner server 130. If desired, the scan-to-application process executing on the client computer 102 can be automatically minimized so that the process continues to run but is not executing in the foreground of the computer display. Alternatively, the scan-to-application process executing on the client computer 102 is not minimized and continues to display a message which permits the user to cancel the scanning operation from the client computer and also indicates that the client computer is waiting to receive image information from the scanner server computer 130.

Step 486 monitors the actions of the user at the client computer 102 to determine whether the user desires to cancel the scanning job at the client computer 102. The determination of step 486 is performed any time after step 484 is performed. For example, the job can be cancelled after the user has begun the scanning operation at the scanner server computer 130. If the user does not desire to cancel the scan-to-application job (no in step 486), the user in step 488 chooses the scan-to-application option at the scanner server computer 130. For example, the scanner server 130 displays an option permitting the user to perform a scan-to-application process or a scan-to-file process and select the scan-to-application process. Subsequently, various machine names or a list of jobs such as the image of FIG. 11 is displayed at the scanner server 130 in step 490. The machine name list 602 includes in the example of FIG. 11, three machine names such as John, Robin, and Henry. In FIG. 11, John is highlighted, and when the user clicks on the "OK" button 606, the scanner job corresponding to the machine name John begins. The image 600 of FIG. 11 also allows the user to cancel the operation of scanning at the scanner server 130 by clicking on the cancel button 608.

After the user selects the appropriate machine name in step 490, a message is displayed at the scanner server computer 130 in step 492 which requests the user to place the document on the scanner and click "start" when ready. The document is then scanned in step 492 in accordance with the previously set parameters which are stored in the scanner image table 160 illustrated in FIG. 5. An image data file or image information is then transmitted in step 496 from the scanner server 130 to the client computer 102 using the read file acknowledge command which was previously explained with respect to FIG. 7L.

Figure 8D:
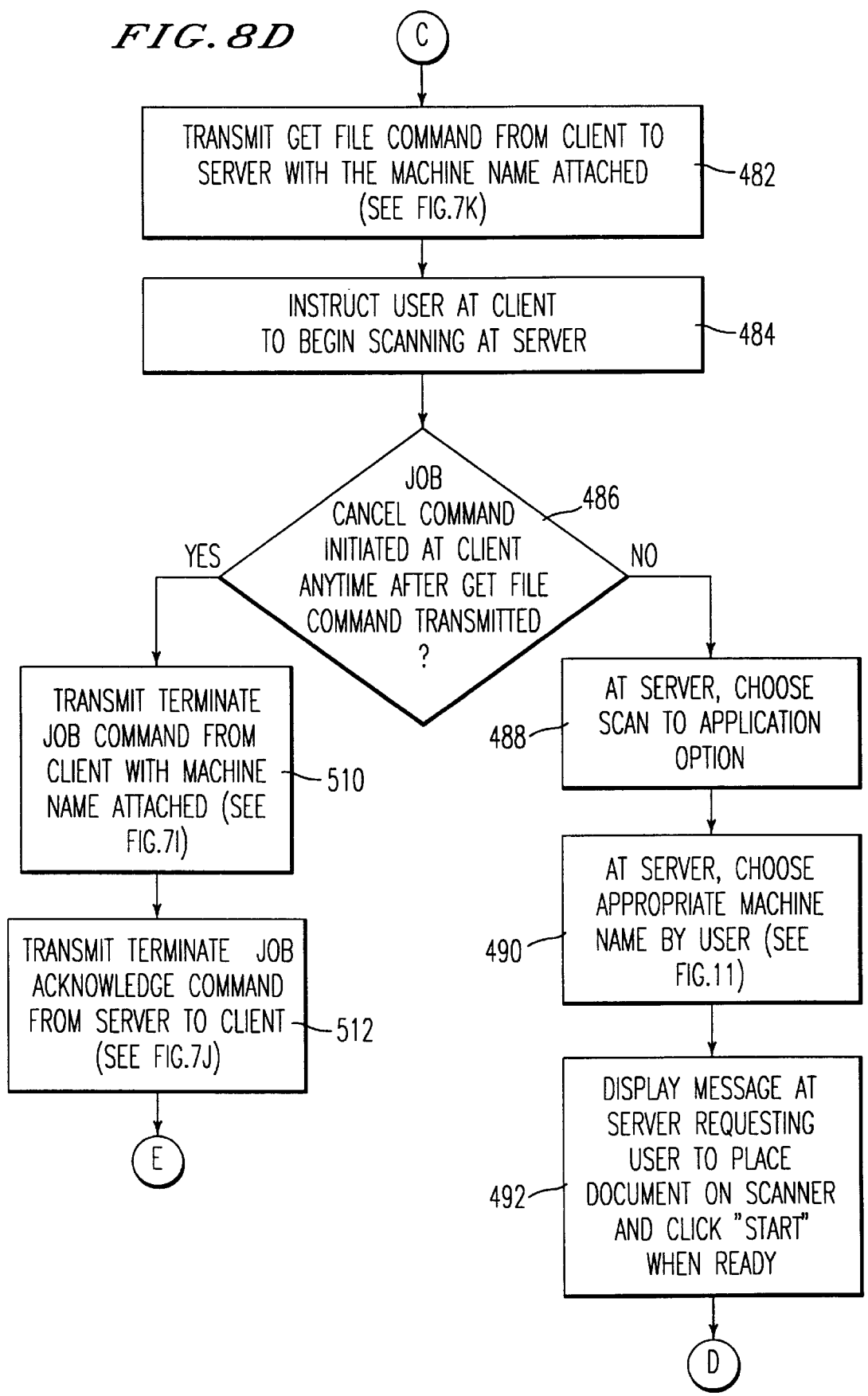

When a user at the client computer indicates a desire to cancel the network scanning operation in step 486 of FIG. 8D, flow proceeds to step 510 in which the client computer 102 transmits the terminate job command from the client computer 102 to the server computer 103 with the machine name attached to the terminate job packet header of FIG. 7I. In step 512, the scanner server computer 130 transmits the terminate job acknowledge command of FIG. 7J to the client computer 102.

After the transmission of the image data file in step 496 and after the transmission of the terminate job acknowledge command in step 512, step 498 of FIG. 8E is performed which transmits the close session command of FIG. 7C from the client computer 102 to the scanner server computer 130. In step 500, the corresponding entry in the process ID table of FIG. 4 is deleted and also the corresponding entry in the scanner image table of FIG. 5 is deleted for this scan-to-application process in step 500. In step 502, the close session acknowledge command of FIG. 7D is transmitted from the scanner server 130 to -the client 102 and the scan-to-application process then ends.

The second aspect of this invention is the scan-to-file option in which a scanner server connected to a network scanner or other image obtaining device transmits an image file which has been acquired over a network to a local storage device of a client computer. The scan-to-file operation utilizes the same hardware which is illustrated in FIGS. 2 and 3. However, the client computer 102 does not need to use the virtual TWAIN driver 106 and uses the file catcher software 112 of the client computer 102 to control the storing of the image file obtained from the scanner server 130 and the scanner 144. The scan task software 134 and the server protocol encoder/decoder 132 of the scanner server computer 130 and the client protocol encoder/decoder 108 of the client computer 102 contain the necessary functionality for both the scan-to-file and scan-to-file aspects of the invention. Of course, different software programs could be developed to carry out the different functionalities of the different aspects of the invention.

The scan-to-file aspect of this invention also uses the process ID table as illustrated in FIG. 4, the same structure as the packet header illustrated in FIG. 6, and the open session, open session acknowledge, close session, and close session acknowledge commands described with respect to FIGS. 7A to 7D.

The scan-to-file operation of the invention uses a machine name table 602 as illustrated in FIG. 12. The machine name table 620 is stored at the scanner server 130 and has a primary purpose of managing scan-to-file clients. The table contains all necessary information to identify and process multiple scan-to-file clients, and a separate entry is maintained in the machine name table for each client-server connection utilized by the scan-to-file operation. An entry is created in the machine name table 620 whenever a client computer registers for a scan-to-file process with the scanner server computer 130 and the entry is deleted upon termination of the scan-to-file operation by the client computer.

The machine name table contains an index field 622 which is an integer which identifies a unique table entry for a client-server scan-to-file session. The indexes can be sequentially assigned and maintained, randomly assigned, or assigned in any desired manner. A machine name field 624 is a character string which contains the name of the client computer 102. This name is presented to the user during the scanning operation at the server, thus allowing the user to identify the client connection and assuring that the scanned image will be transported to the correct client workstation. A client address field 626 stores the network address of the client computer 102.

With regard to the protocol packets utilized by the scan-to-file operation of this invention, as explained above, the open session, open session acknowledge, close session and close session acknowledge commands described with respect to the scan-to-application operation are used with the scan-to-file operation. Additionally, in order to perform a scan-to-file operation, the initialize session, initialize session acknowledge, terminate session, terminate session acknowledge, get storage file, and get storage file acknowledge commands illustrated in FIGS. 13A–13F are utilized by the invention.

A packet header 640 is utilized by the initialize session command. The initialize session command is used to register the client computer 102 with the scanner server computer 130 for the scan-to-file operation and contains a data size field 658 which contains the size of the machine or client name plus the size of the network address. The data which follows the initialize session packet header 640 includes the machine name and the network address of the client computer 102. After the scanner server computer 130 receives the initialize session command which causes a machine name table entry to be created in the scanner server 130, the scanner server 130 transmits an initialize session acknowledge packet header 670 as illustrated in FIG. 13B which acknowledges receipt of the initialize session command.

When the client computer 102 wishes to unregister itself with the scanner server computer 130 for the scan-to-file operation, the client computer 102 transmits a terminate session command in accordance with the packet header 690 illustrated in FIG. 13C. The packet header 690 includes a data size field 708 which contains the size of the machine name or name of the client computer 102, followed by data defining the machine name. After the scanner server 130 receives the terminate session command, the entry in the machine name table 620 corresponding to the client computer 102 is deleted and the server computer 130 transmits to the client computer 102 a terminate session acknowledge command using the packet header structure 710 illustrated in FIG. 13D.

In order to transmit image information or an image file from the scanner server 130 to the client computer 102 over the network 120, the get storage file command or protocol header 900 illustrated in FIG. 13E is utilized by the scan-to-file application aspect of the invention. This command operates in a similar manner as the read file acknowledge command illustrated in FIG. 7L. When an image file is ready to be transmitted from the scanner server 130 to the client computer 102, the scanner server 130 initiates the transfer of data by transmitting the get storage file command 916 having the image information as attached data. The data size field 918 of the get storage file command 900 indicates the size of data to follow which is equal to the maximum packet size minus the quantity including the size of the packet header plus the size of the file data to be transmitted. As the image data is usually lengthy, the image or file data is transmitted in a plurality of packets, each having a corresponding packet header.

FIG. 13F illustrates the get storage file acknowledge packet header 920 which is transmitted from the client computer 102 to the scanner server 130 in order to acknowledge receipt of the data. The get storage file acknowledge packet header 920 is transmitted from the client computer 102 to the scanner server 130 after successful transmission of the complete image file. Alternatively, the get storage file acknowledge packet header is transmitted in response to each get storage file packet header from the scanner server 130, in response to each end of an image page, or in response to a predetermined number of get storage file packet headers which have been received. A data size field 940 of the get storage file acknowledge packet header 920 contains the size of the machine name of the client computer transmitting the packet header 920. The data which follows or is attached to the packet header 920 contains the name of the client computer.

The process performed during the scan-to-file operation is illustrated in the flowcharts of FIGS. 14A–14D. After starting and loading the appropriate software onto the client computer 102 and the scanner server computer 130 including the file catcher software 112, the client protocol encoder/decoder software 108, the server protocol encoder/decoder 132, the scan task software 134, and the TWAIN driver 136, step 740 determines the network scanners such as the scanner 144 which are available for the scan-to-file operation. Step 740 can be carried out in the same way as step 456 of FIG. 8A is performed and a repetition of this description is omitted for brevity. If there are a plurality of workgroup or network scanners available, step 740 can include steps similar to steps 458 and 460 of FIG. 8A which allow the user to select one of a plurality of workgroup scanners. Further, it is also possible to implement this invention so that the client computer 102 can be registered with a plurality of scanner server computers. In this case, the steps 742–758 which register the client computer with the scanner server are performed for each server at which the client computer is to be registered.

After the server(s) which is to be used for the scan-to-file operation is determined, the client computer 102 transmits the open session command of FIG. 7A to the scanner server 102 including the client machine name, the client address and port number in step 742. In step 744, the open session command is received by the server 130 and the server 130 creates an entry in the process ID table 150 illustrated in FIG. 4. Subsequently, the server 130 transmits the open session acknowledge command illustrated in FIG. 7B to the client in step 746.

In step 748, the client computer 102 transmits the initialize session command of FIG. 13A to the scanner server 130 in order to register the client computer 102 with the server 130 for the scan-to-file operation. The initialize session command includes data of the name of the client computer or machine name, the address of the client and port number. The present inventors realize that the same information is transmitted by the open session command and the initialize session command and therefore transmission of both of these commands with the same data attached thereto or following the packet header might be considered redundant or unnecessary. However, by keeping these commands as separate commands and transmitting the necessary information with each command, future versions of the invention will allow changes to be implemented quite easily. For example, if a future version of this invention requires the initialize session command to have different data attached thereto than the data attached to the open session command, very little, if any changes will need to made to the software. However, it is possible to eliminate future flexibility and not transmit any data with the initialize session command, if desired. In this case, the data utilized with the initialize session command is read from stored information at the scanner server 130.

In step 750, the server computer 130 receives the initialize session command from the client computer 102 and creates an entry in the machine name table of FIG. 12 including an index which can be sequentially assigned to each entry in the machine name table, the name of the client computer which is the machine name, and the network address of the client which can be the port number. Next, step 752 transmits the acknowledge initialize session command as illustrated in FIG. 13B from the server computer 130 to the client computer 102.

Step 754 then transmits the close session command of FIG. 7C from the client computer 102 to the scanner server 130. In step 756, the scanner server 130 deletes the corresponding entry in the process ID table and transmits the close session acknowledge command of FIG. 7D from the scanner server 130 to the client computer 102. In step 758, the client computer receives the close session acknowledge command transmitted by the scanner server 130, and minimizes the file catcher program 112 at the client computer 102. The minimized file catcher program 112 continues to listen to the address which is assigned to the client computer 102 and the port assigned to the scan-to-file software operation for an incoming image file from the scanner server 130. In this manner, the client computer 102 can perform any other operation, (e.g., operations which are unrelated to scanning such as word processing operations) while the client computer 102 continues to wait for image files transmitted from the scanner server 130.

After performing step 758, the client computer 102 is registered with the scanner server 130 and the user can perform the scan-to-file operation at any time. When the user desires to obtain an image file and transfer this image file to the client computer 102, the user goes to the network scanner (or other networked image acquiring device) which is connected to the scanner server 130 at which the user is registered and selects the scan-to-file option from a displayed menu in step 760. If the client computer 102 is registered with a plurality of scanner servers, the user can go to any of the scanner servers at which he is registered. The present invention allows both the scan-to-application and scan-to-file operations to take place at the scanner server computer 130. In the preferred embodiment of the invention, a graphical menu is ordinarily displayed on a computer monitor of the scanner server 130. This menu has options which allow the user to select whether it is desired to perform the scan-to-application or scan-to-file operation. In step 762, the user selects the scan-to-file option.

Figure 15:
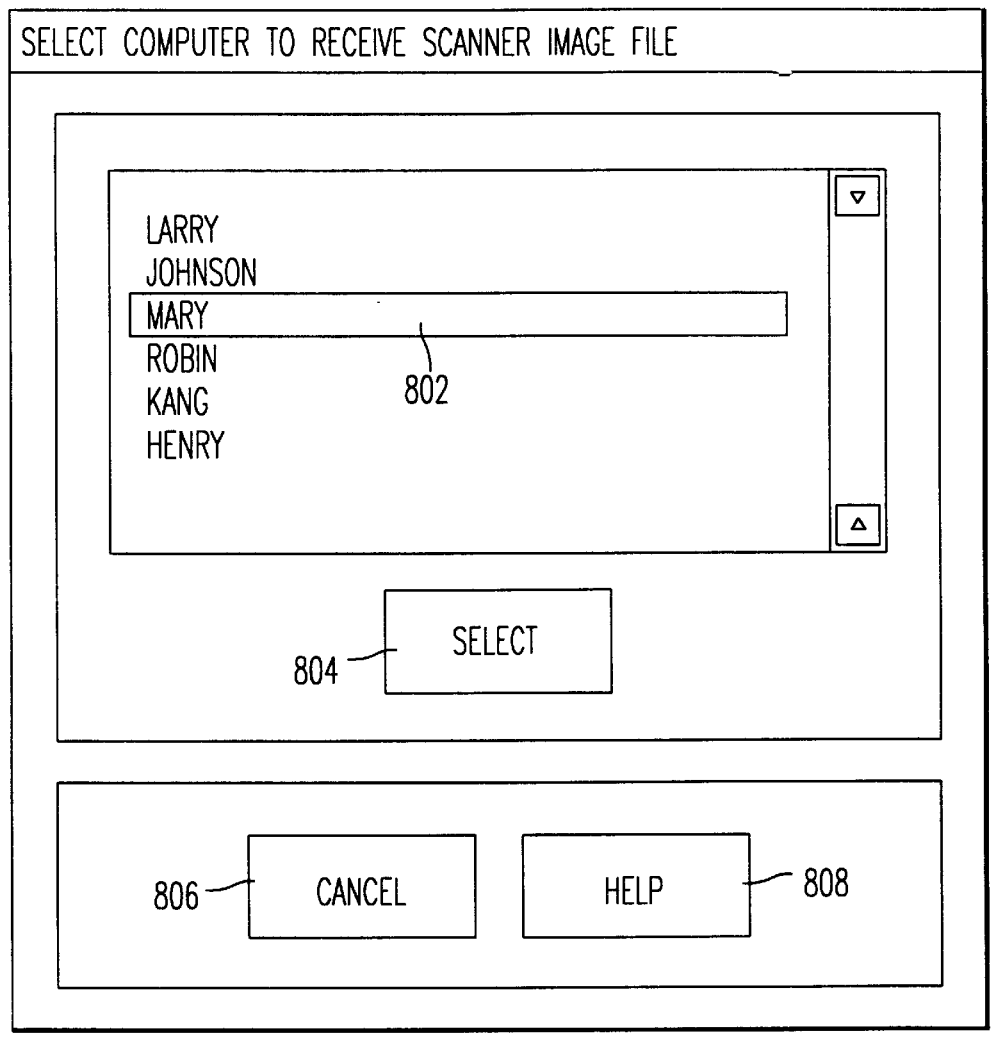
FIG. 15 illustrates an image of a screen display at the scanner server which allows a user to select which computer is to receive the scanner image file resulting from the scan-to-file operation.

After selecting the scan-to-file option, the server displays a plurality of client computers which have been registered at the scanner server 130 for the scan-to-file operation and have entries in the machine name table of FIG. 12. FIG. 15 illustrates an image 800 which contains a list of names corresponding to registered machine names at the scanner server 130. The list of names includes the name "Mary" 802 which is highlighted. A select button 804, when clicked on by the user, selects the highlighted name. Also included in the image 800 of FIG. 15 are a cancel button 806 and a help button 808 which respectively permit the cancellation of the select operation and also provides help information to a user.

After the user selects the client computer to receive the image file in step 762 using the image display of FIG. 15, the user selects the scanning parameters at the scanner server 130 using the TWAIN driver 136 in step 764. During this operation of selecting parameters, the scan task software 134 of the scanner server 130 acts as any image acquiring software which is TWAIN compatible. The TWAIN driver 136 of the scanner server can be implemented in accordance with the conventional TWAIN standard and does not operate as a virtual TWAIN driver, as has been described for the virtual TWAIN driver 106 utilized by the client computer 102 during the scan-to-application process. The setting of the scanning parameters in step 764 is preferably performed using a graphical user interface, similar to the graphical user interface illustrated in FIG. 10 which was described with respect to the scan-to-application operation of the invention. As an alternative to setting the scanning parameters as described above, it is also possible to set the scanning parameters for the scan-to-file aspect of this invention in a similar manner as was performed for the scan-to-application aspect of the invention.

The images are scanned in step 766 using the scanner 144 or other image acquiring device utilizing the TWAIN driver 136. The scanning operation is controlled by the scanner server 130, the TWAIN driver 136 along with the scan task software 134. In step 768, the scanner server 130 transmits the image file which was obtained to the selected client computer 102. It is to be noted that the image file which is transmitted in step 768 to the client computer 102 is not transmitted into the application 104 which is running on the client computer 102 but is simply stored as a file 110 within a storage device at the client computer 102.

In order to transmit the image file from the scanner server 130 to the client computer 102, the scanner server 130 transmits the open session command or packet header to the client computer 102 and the client computer 102 transmits back to the scanner server 130 the open session acknowledge command. In response to this action, the scanner server 130 creates a corresponding entry in the process ID table 150. Next, the image file is transmitted from the scanner server 130 to the client computer 102 using the get storage file command or packet header illustrated in FIG. 13E. In response to receipt of the packet header(s) transmitting the image information, the client computer 102 transmits the get storage file acknowledge command or packet header as illustrated in FIG. 13F to the scanner server 130. After the transfer of the image to the client computer 102 is complete, the scanner server 130 transmits the close session command to the client computer 102 and the client computer responds with the close session acknowledge command. Alternatively, the client computer 102 transmits the close session command and the scanner server 130 transmits the corresponding acknowledge.

It is to be noted that the transfer of the image file is performed by transferring the image file from the scanner server 130 to the client computer 102 without storing the image in a file which is indexed for retrieval by a user. This means that there is not an intermediate step of storing the image file in a file server and subsequent retrieval of this file by the user. It is possible that during the transfer of the image file, the image file is temporarily stored in one or more storage devices along the network transmission route. However, this temporary storage does not typically permit the file to be retrieved by the user of the client computer and merely serves as a step in relaying the file to its final destination at the client computer. In this manner, the image file arrives at the client computer 102 without a retrieval process being performed by the user in order to retrieve the file from an intermediate storage device such as the file server.

As an alternative to using the get storage file command described above, conventional and known file transfer techniques utilized across the network 120 are performed and therefore, special protocol commands implemented for use by this invention do not need to be utilized, but any desired type of file transfer mechanism over a network including known file transfer protocols can be utilized by the invention. As one example, FTP is a known internet file transfer protocol which allows images to be both downloaded to and uploaded from client computers on the Internet. Further, any other file transfer protocol such as file transfer protocols used with Novell NetWare networks and any other TCP/IP file transfer protocols can be used.

Figure 16:
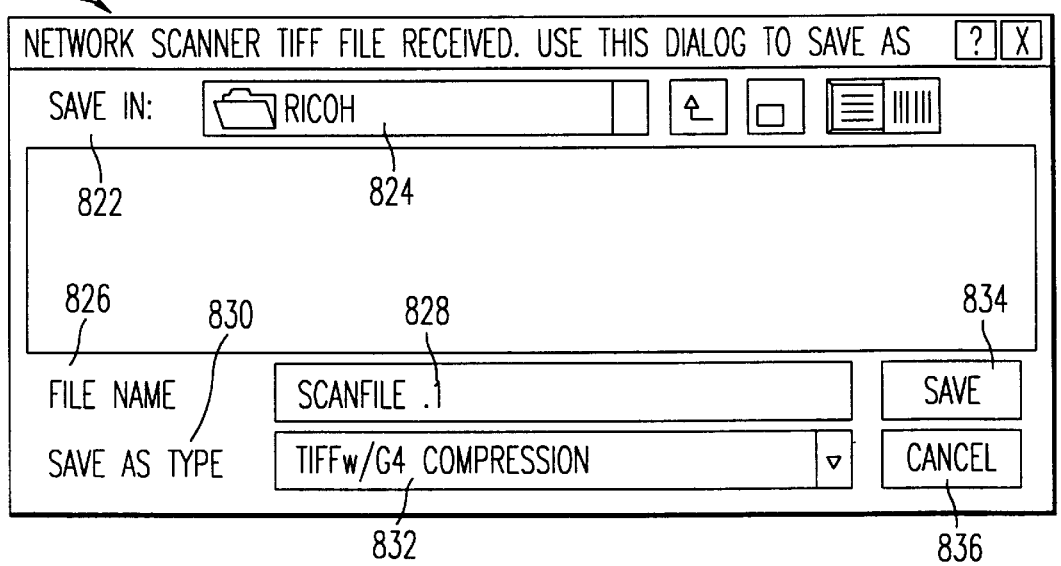
FIG. 16 illustrates a dialog box which pops up at the client computer indicating that an image file has been received from the network scanner and requests the user to provide information as to how this file is to be saved.

After the client computer 102 receives the image file, a dialog box is displayed on the monitor of the client computer 102 which indicates that an image file has arrived, as illustrated in FIG. 16. In the image of FIG. 16, a message 822 is displayed which allows the user to select the folder or subdirectory such as a Ricoh folder 824. A message 826 allows the user to select a file name and in this case, the file name is "scanfile.1" as indicated in field 828. Message 830 indicates that different file types can be used and field 832 indicates that the file will be saved as a TIFF image file and use G4 compression. The save button 834 allows the user to execute the file save operation, and the cancel button 836 allows the user to cancel the operation.

Figure 14B:
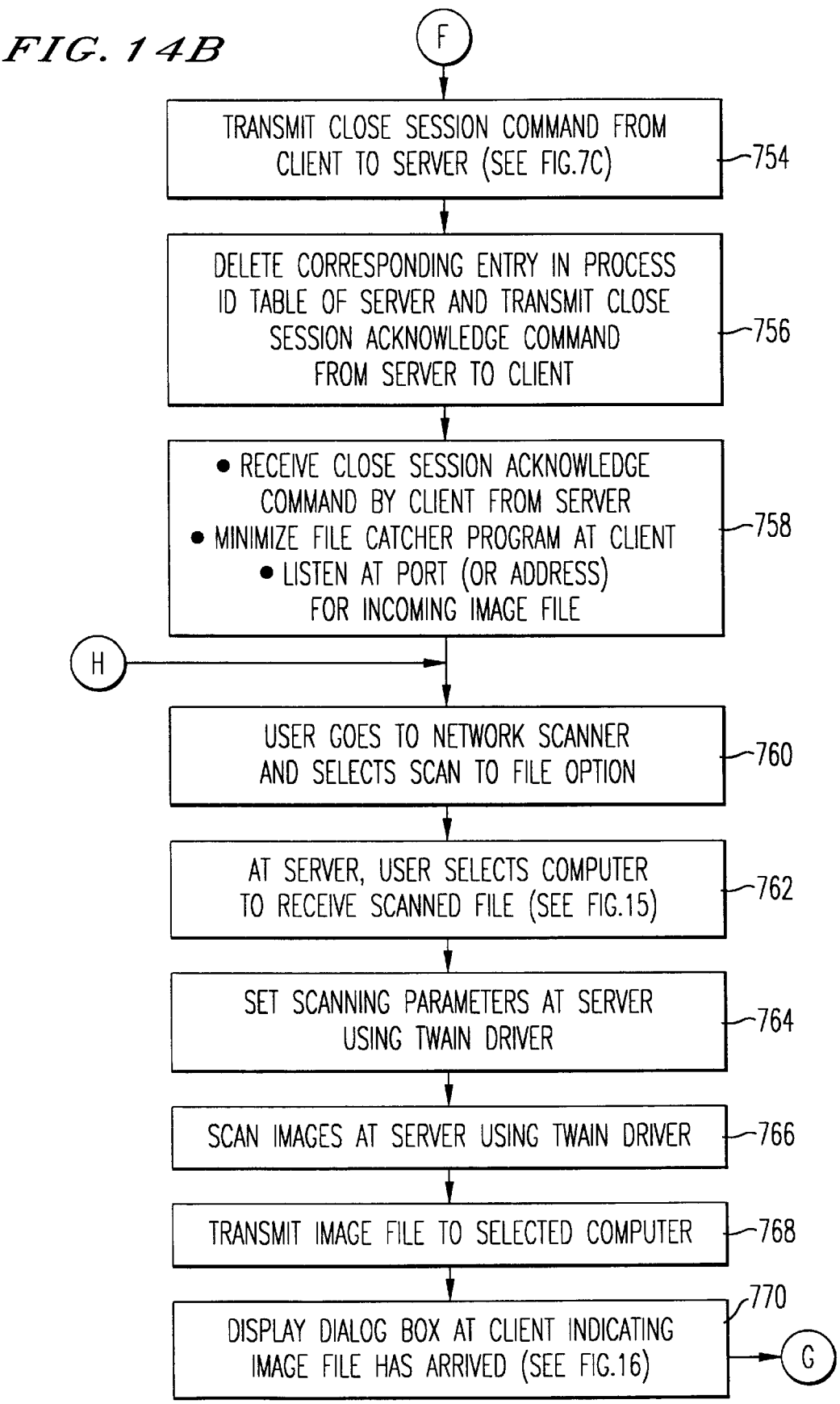
Figure 14C:
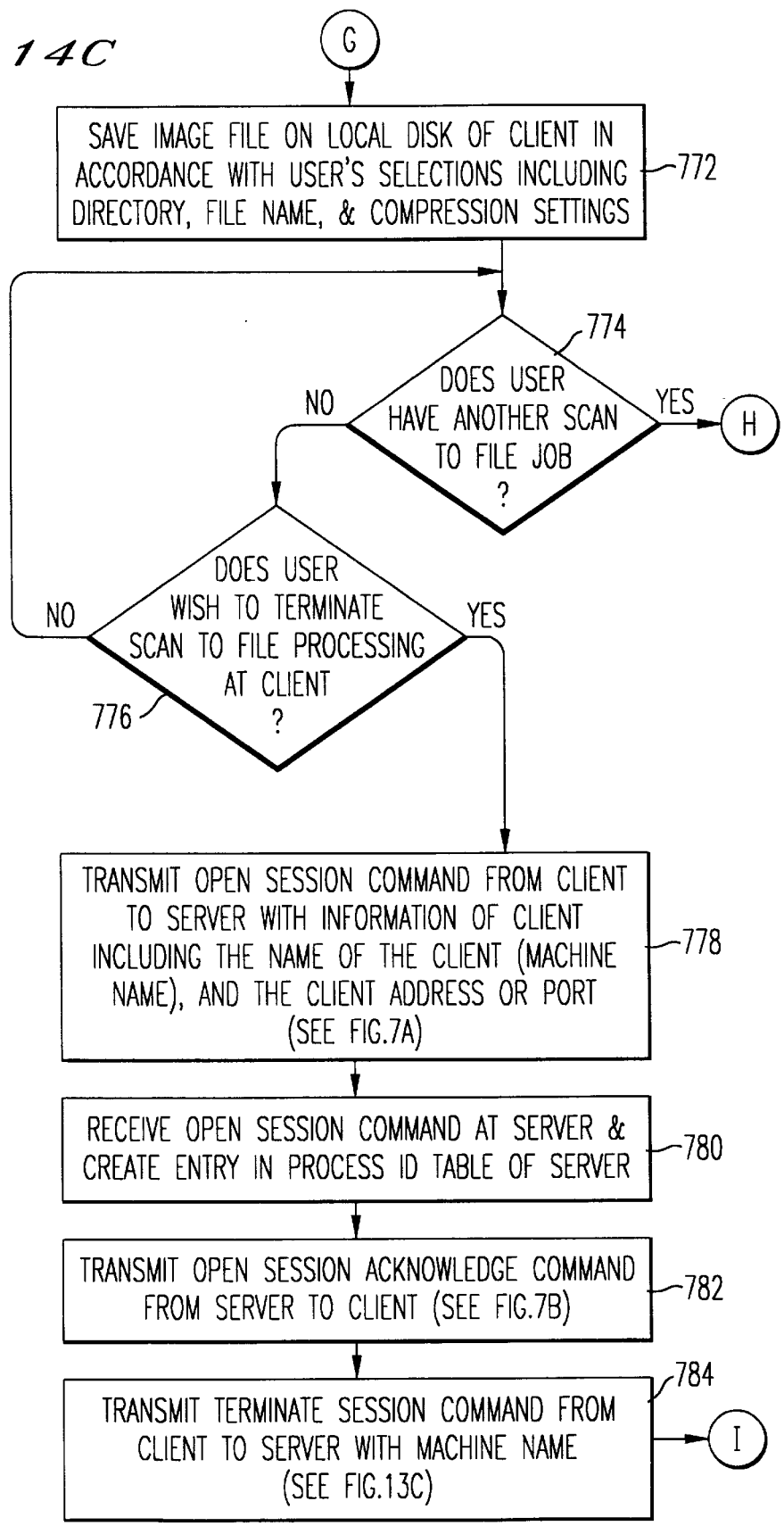
Figure 14D:
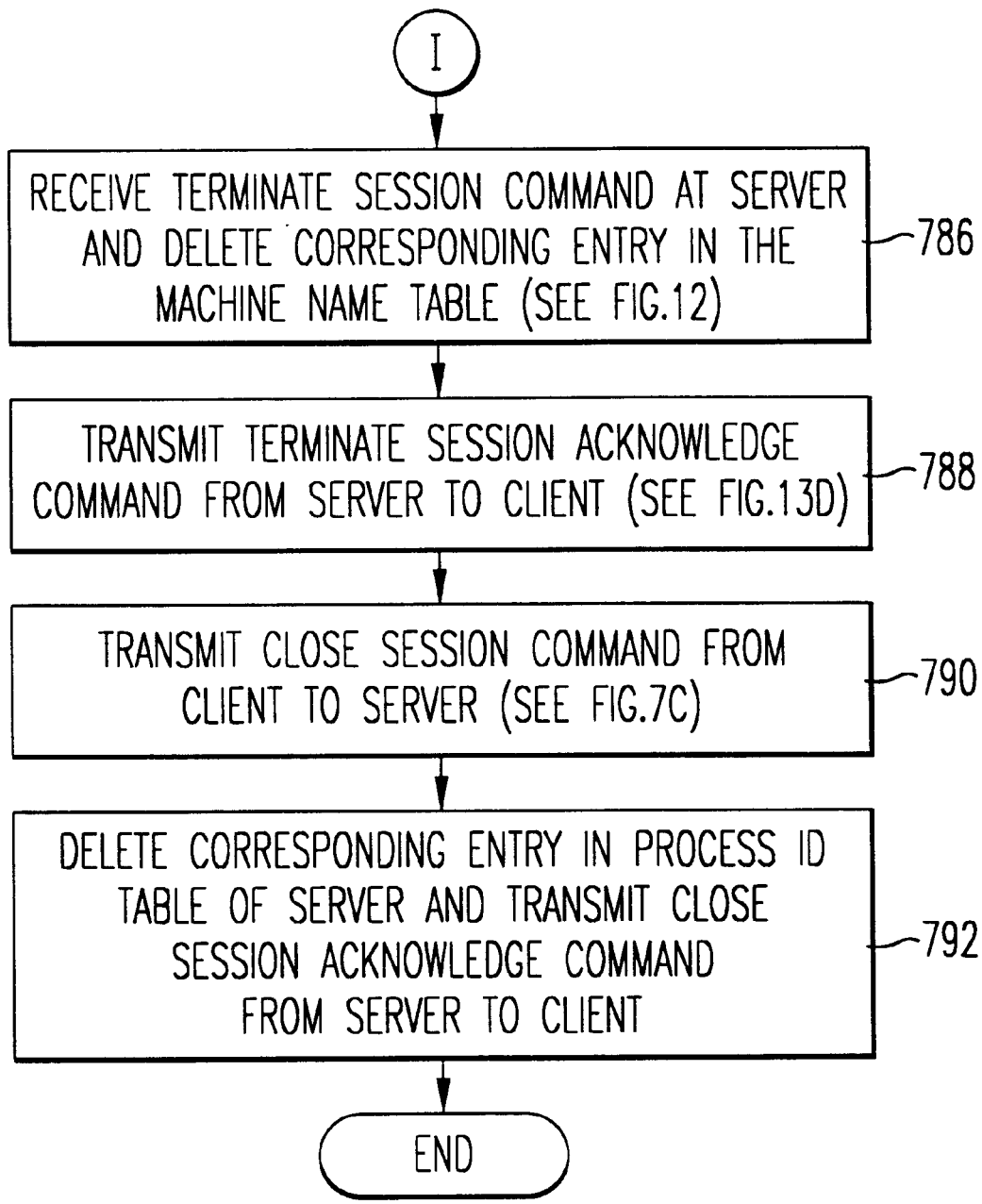

In step 772 of FIG. 14C, the user selects the directory or folder, file name, and compression settings using the dialog box illustrated in FIG. 16 and saves the file in accordance with these settings by pressing the save button 834 of FIG. 16. Step 774 then determines whether the user has another scan-to-file job which is desired to be performed. If the answer is "YES", flow proceeds to step 760 of FIG. 14B in which the user repeats the scan-to-file operation. If the user does not currently have another scan-to-file job, flow proceeds from step 774 to step 776 which inquires whether the user wishes to terminate the scan-to-file processing at the client computer. If the user does not wish to cancel the scan to client processing but might perform another scan-to-file operation in the future, the loop of steps 774 and 776 continues until the user has another scan job or the user wishes to terminate the scan-to-file processing at the client. The user will usually wish to terminate the scan-to-file processing at the client when the user wishes to shut down or turn off the client computer 102. When the user does wish to terminate the scan-to-file processing, flow proceeds to step 778 which transmits the open session command of FIG. 7A from a the client computer 102 to the scanner server 130 with information including the name of the client and the client address or port. In step 780, the scanner server 130 receives the open session command and creates an entry in the process ID table of the server. In step 782, the open session acknowledge command illustrating FIG. 7B is transmitted from the scanner server 130 to the client computer 102 in step 782. In step 784, the terminate session command of FIG. 13C is transmitted from the client to the server including data of the machine name so that the scanner server will know which scan-to-file entry in the machine name table to delete.

In step 786, the terminate session command is received by the server 130 and the server 130 deletes the corresponding entry in the machine name table illustrated in FIG. 12. In step 788, the server 130 transmits the terminate session acknowledge command of FIG. 13D to the client computer 102. In step 790, the client transmits the close session command of FIG. 7C from the client computer 102 to the server 130. Step 792 then deletes the corresponding entry in the process ID table of the server 102, and the server 130 transmits the close session acknowledge command to the client 102. The process of FIG. 14D then ends.

The scan-to-file aspect of this invention allows the easy transfer of image files across computer networks including the Internet. The use of the scan-to-file operation over the Internet provides easy and very inexpensive way to transfer image files long or short distances. This permits the use of the scan-to-file operation to operate like a facsimile machine. However, the present invention has the advantage that grey scale and color images can be easily transmitted. This transmission of images over the Internet can be called an I-Fax (Internet fax) or E-Fax (electronic fax).

This invention may be conveniently implemented using a conventional general purpose digital computers or microprocessors programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions. If desired, different storage mediums can be used to store the software used by the client computer 102 and the scanner server 130. The present invention also includes memories which store the various data structures which include the tables and packet header structures used by the invention. The memories include, for example, RAMs including SRAMs and DRAMs, and disk memory such as a hard disk, and any other type of memories which are writable.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method of acquiring an image and transmitting the image from a first computer to a second computer, comprising the steps of:

executing an application program by the second computer, the application program interfacing with a scanner driver of the second computer which is usable with a plurality of application programs;

indicating, using the scanner driver of the second computer, that an image is to be acquired using the application program;

transmitting a command from the second computer to the first computer over a computer network indicating that an image is to be acquired;

receiving the command by the first computer;

acquiring an image at the first computer, after the step of receiving the command by the first computer;

transmitting over the computer network the image from the first computer to the second computer; and storing the image on a storage medium of the second computer.

2. A method according to claim 1, further comprising the step of:

setting parameters of the step of acquiring the image at the second computer.

3. A method according to claim 1, further comprising the step of:

transmitting a command from the second computer to the first computer which requests the first computer to transmit parameter information for the acquiring step; and transmitting the parameter information from the second computer to the first computer.

4. A method according to claim 3, wherein:

the step of transmitting the command which requests the first computer to transmit the parameter information comprises transmitting a command which requests the first computer to transmit capability information of an acquiring device which performs the step of acquiring.

5. A method according to claim 3, wherein:

the step of transmitting the command which requests the first computer to transmit the parameter information comprises transmitting a command which requests the first computer to transmit capability information of an acquiring device which performs the step of acquiring and parameters which are to be used during the acquiring step.

6. A method according to claim 1, further comprising the step of:

determining, by the second computer, whether the first computer is present on the network.

7. A method according to claim 6, further comprising the step of:

selecting, by the second computer, that said first computer is to perform said acquiring, when said step of determining whether the first computer is present on the network determines that said first computer is present on the network and there is another computer on the network which is capable of acquiring and transferring images over the network to the second computer.

8. A method according to claim 1, further comprising the step of:

writing information in a data structure at the first computer including identification information of the second computer.

9. A method according to claim 8, further comprising the step of:

writing parameters used for the acquiring step in a data structure of the first computer.

10. A method according to claim 1, further comprising the step of:

indicating, by a user at the first computer, that the acquiring step is to be performed.

11. A method according to claim 1, further comprising the steps of:

displaying, at the first computer, information indicating a plurality of acquiring jobs which can be performed; and selecting at the first computer, by a user of the application program at the second computer, one of the plurality of acquiring jobs.

12. A method according to claim 1, further comprising the step of:

creating an entry in a memory having a data structure at the first computer, when there is an open communication session between the first and second computers.

13. A method according to claim 1, wherein said step of acquiring comprises:

scanning the image.

14. A method according to claim 1, further comprising the step of:

registering the second computer with the first computer by a communication which initiates at the second computer.

15. A system for acquiring an image and transmitting the image from a first computer to a second computer, comprising:

means for executing an application program by the second computer, the application program interfacing with a scanner driver of the second computer which is usable with a plurality of application programs;

means for indicating, using the scanner driver of the second computer, that an image is to be acquired using the application program;

means for transmitting a command from the second computer to the first computer over a computer network indicating that an image is to be acquired;

means for receiving the command by the first computer;

means for acquiring an image at the first computer, after the means for receiving the command by the first computer receives the command;

means for transmitting over the computer network the image which was acquired from the first computer to the second computer; and means for storing the image on a storage medium of the second computer.

16. A system according to claim 15, further comprising:

means, at the second computer, for setting parameters of the means for acquiring.

17. A system according to claim 15, further comprising:

means for transmitting a command from the second computer to the first computer which requests the first computer to transmit parameter information for the means for acquiring; and means for transmitting the parameter information from the second computer to the first computer.

18. A system according to claim 17, wherein:

the means for transmitting the command which requests the first computer to transmit the parameter information comprises means for transmitting a command which requests the first computer to transmit capability information of the means for acquiring.

19. A system according to claim 17, wherein:

the means for transmitting the command which requests the first computer to transmit the parameter information comprises means for transmitting a command which requests the first computer to transmit capability information of the means for acquiring and parameters which are to be used by the means for acquiring.

20. A system according to claim 15, further comprising: means for determining, by the second computer, whether the first computer is present on the network.

21. A system according to claim 20, further comprising:

means for selecting, by the second computer, that said first computer is to perform said acquiring with the means for acquiring, when said means for determining whether the first computer is present on the network determines that said first computer is present on the network and there is another computer on the network which is capable of acquiring and transferring images over the network to the second computer.

22. A system according to claim 15, further comprising:

means for writing information in a data structure at the first computer including identification information of the second computer.

23. A system according to claim 22, further comprising:

means for writing parameters used by the means for acquiring in a data structure of the first computer.

24. A system according to claim 15, further comprising:

means for indicating, by a user at the first computer, that an acquiring is to be performed by the means for acquiring.

25. A system according to claim 15, further comprising:

means for displaying, at the first computer, information indicating a plurality of acquiring jobs which can be performed; and means for selecting at the first computer, by a user of the application program at the second computer, one of the plurality of acquiring jobs.

26. A system according to claim 15, further comprising:

means for creating an entry in a memory having a data structure at the first computer, when there is an open communication session between the first and second computers.

27. A system according to claim 15, wherein said means for acquiring comprises:

an image scanner.

28. A system according to claim 15, further comprising:

means for registering the second computer with the first computer by a communication which initiates at the second computer.

29. An article of manufacture, comprising:

a computer usable medium having computer readable program code embodied therein for acquiring an image and transmitting the image from a first computer to a second computer, comprising:

computer readable program code means for executing an application program by the second computer, the application program interfacing with a scanner driver of the second computer which is usable with a plurality of application programs;

computer readable program code means for indicating, using the scanner driver of the second computer, that an image is to be acquired using the application program;

computer readable program code means for transmitting a command from the second computer to the first computer over a computer network indicating that an image is to be acquired;

computer readable program code means for receiving the command by the first computer;

computer readable program code means for acquiring an image at the first computer, after the step of receiving the command by the first computer;

computer readable program code means for transmitting over the computer network the image from the first computer to the second computer; and computer readable program code means for storing the image on a storage medium of the second computer.

30. An article of manufacture according to claim 29, further comprising:

computer readable program code means for setting parameters of the step of acquiring the image at the second computer.

31. A method according to claim 1, wherein the step of executing an application program by the second computer comprises:

executing the application program which interfaces with the scanner driver which is a TWAIN compatible scanner driver.

32. A method according to claim 1, wherein the step of executing an application program by the second computer comprises:

executing the application program which interfaces with the scanner driver which is a virtual TWAIN driver.

33. A system according to claim 15, wherein the means for executing an application program by the second computer comprises:

means for executing the application program which interfaces with the scanner driver which is a TWAIN compatible scanner driver.

34. A system according to claim 15, wherein the means for executing an application program by the second computer comprises:

means for executing the application program which interfaces with the scanner driver which is a virtual TWAIN driver.

35. An article of manufacture according to claim 29, wherein the computer readable code means for executing an application program by the second computer comprises:

computer readable program code means for executing the application program which interfaces with the scanner driver which is a TWAIN compatible scanner driver.

36. An article of manufacture according to claim 15, wherein the computer readable program code means for executing an application program by the second computer comprises:

computer readable program code means for executing the application program which interfaces with the scanner driver which is a virtual TWAIN driver.

* * * * *